United States Patent
Eslick et al.

(10) Patent No.: US 7,032,103 B2
(45) Date of Patent: *Apr. 18, 2006

(54) SYSTEM AND METHOD FOR EXECUTING HYBRIDIZED CODE ON A DYNAMICALLY CONFIGURABLE HARDWARE ENVIRONMENT

(75) Inventors: Ian S. Eslick, Mountain View, CA (US); Mark Williams, San Jose, CA (US); Robert S. French, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 263 days.

This patent is subject to a terminal disclaimer.

(21) Appl. No.: 10/694,282

(22) Filed: Oct. 27, 2003

(65) Prior Publication Data

US 2004/0088705 A1    May 6, 2004

Related U.S. Application Data

(63) Continuation of application No. 09/608,860, filed on Jun. 30, 2000, now Pat. No. 6,675,289.

(51) Int. Cl.
*G06F 9/445* (2006.01)
(52) U.S. Cl. .......................... 712/226; 712/15
(58) Field of Classification Search ................ 712/226, 712/11, 15, 16, 37; 709/220, 221
See application file for complete search history.

(56) References Cited

U.S. PATENT DOCUMENTS

| | | | |
|---|---|---|---|
| 4,967,340 A | 10/1990 | Dawes | |
| 5,388,215 A | 2/1995 | Baker et al. | |
| 5,497,498 A * | 3/1996 | Taylor | 710/104 |
| 5,742,180 A | 4/1998 | DeHon et al. | |
| 5,778,226 A | 7/1998 | Adams et al. | |
| 5,787,246 A * | 7/1998 | Lichtman et al. | 709/220 |
| 5,915,123 A * | 6/1999 | Mirsky et al. | 712/16 |
| 5,949,994 A * | 9/1999 | Dupree et al. | 712/228 |
| 5,956,518 A | 9/1999 | DeHon et al. | |
| 6,075,939 A | 6/2000 | Bunnell et al. | |
| 6,108,760 A | 8/2000 | Mirsky et al. | |
| 6,122,719 A | 9/2000 | Mirsky et al. | |
| 6,326,806 B1 * | 12/2001 | Fallside et al. | 326/38 |
| 6,351,846 B1 | 2/2002 | Collin et al. | |

OTHER PUBLICATIONS

Brebner, Gordon, "A Virtual Hardware Operating System for the Xilinx XC6200", Field-Programmable Logic and Applications, 6th International Workshop, Sep. 23-25, 1996, pp. 327-336, XP008037568.

(Continued)

*Primary Examiner*—Eric Coleman
(74) *Attorney, Agent, or Firm*—Christie, Parker & Hale, LLP

(57) ABSTRACT

A system and method for executing previously created run time executables in a configurable processing element array is disclosed. In one embodiment, this system and method begins by identifying at least one subset of program code. The method may then generate at least one set of configuration memory contexts that replaces each of the at least one subsets of program code, the at least one set of configuration memory contexts emulating the at least one subset of program code. The method may then manipulate the at least one set of multiple context processing elements using the at least one set of configuration memory contexts. The method may then execute the plurality of threads of program code using the at least one set of multiple context processing elements.

30 Claims, 19 Drawing Sheets

OTHER PUBLICATIONS

Jean, Jack S.N., et al., "Dynamic Reconfiguration to Support Concurrent Applications", IEEE Transactions on Computers, vol. 48, No. 6, Jun. 1999, pp. 591-602, XP-000832606.

Lee, Ming-Hau, et al., "Design and Implementation of the MorphoSys Reconfigurable Computing Processor", Journal of VLSI Signal Processing Systems, Mar. 2000, pp. 147-162, Kluwer Academic Publishers, The Netherlands, XP-000908462.

European Search Report for European Patent Application No. EP 01 25 0247 dated Dec. 7, 2004, 2pp.

"Smart Compilers Puncture Code Bloat," Brown, Electronic Engineering Times, Oct. 9, 1995 (pp. 38 & 42).

"A High-Performance Miicroarchitecture with Hardware-Programmable Functional Units," Razdan et al., Micro-27 Proceedings of the 27th Annual International Symposium on Microarchitecture, Nov. 30-Dec. 2, 1994 (pp. 172-180).

"Programmable Active Memories: Reconfigurable Systems Come of Age," IEEE Transactions on VLSI Systems, 1995 (pp. 1-15).

"Pilkington Preps Reconfigurable Video DSP," Clark, EE Times, week of Jul. 31, 1995.

"Coarse-Grain Reconfigurable Computing," Mirsky, Ethan A., Thesis submitted at the Massachusetts Institute of Technology, Jun. 1996.

"SOP: Adaptive Massively Parallel System," by Tsukasa Yamauchi et al., NEC Research & Development, vol. 37, No. 3, Jul. 1996 (pp. 382-393).

* cited by examiner

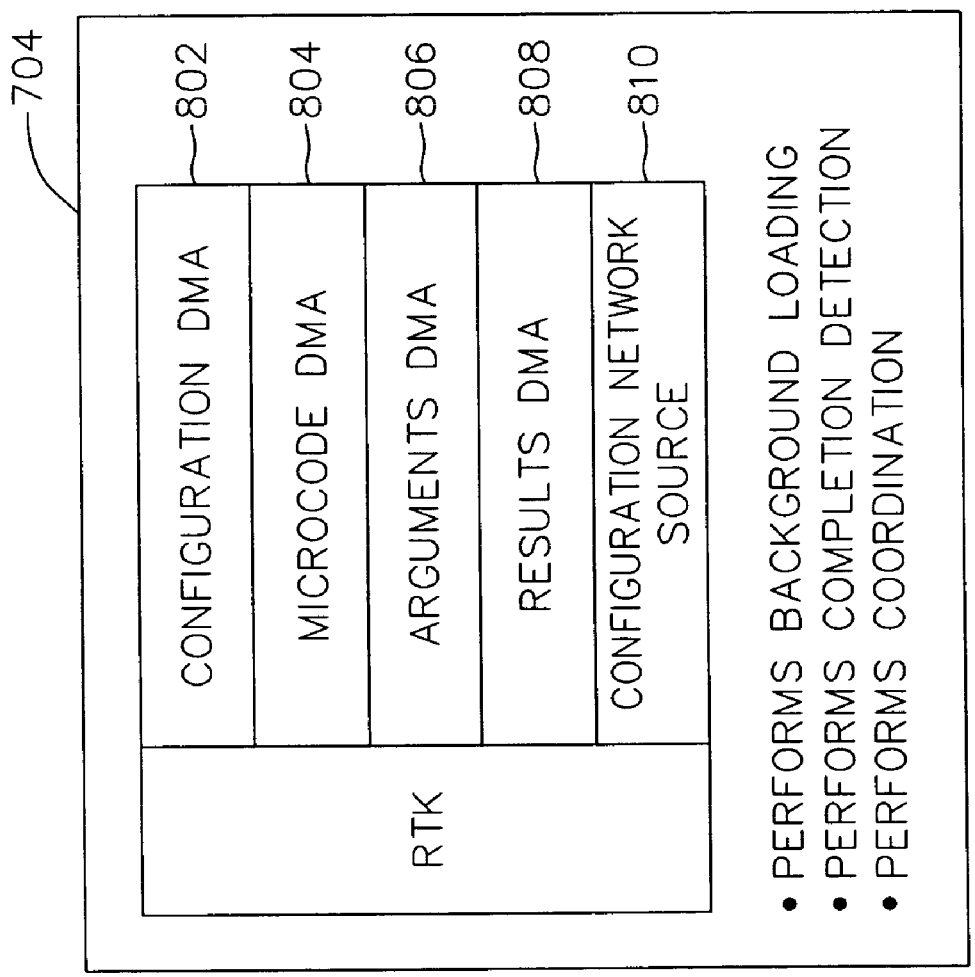

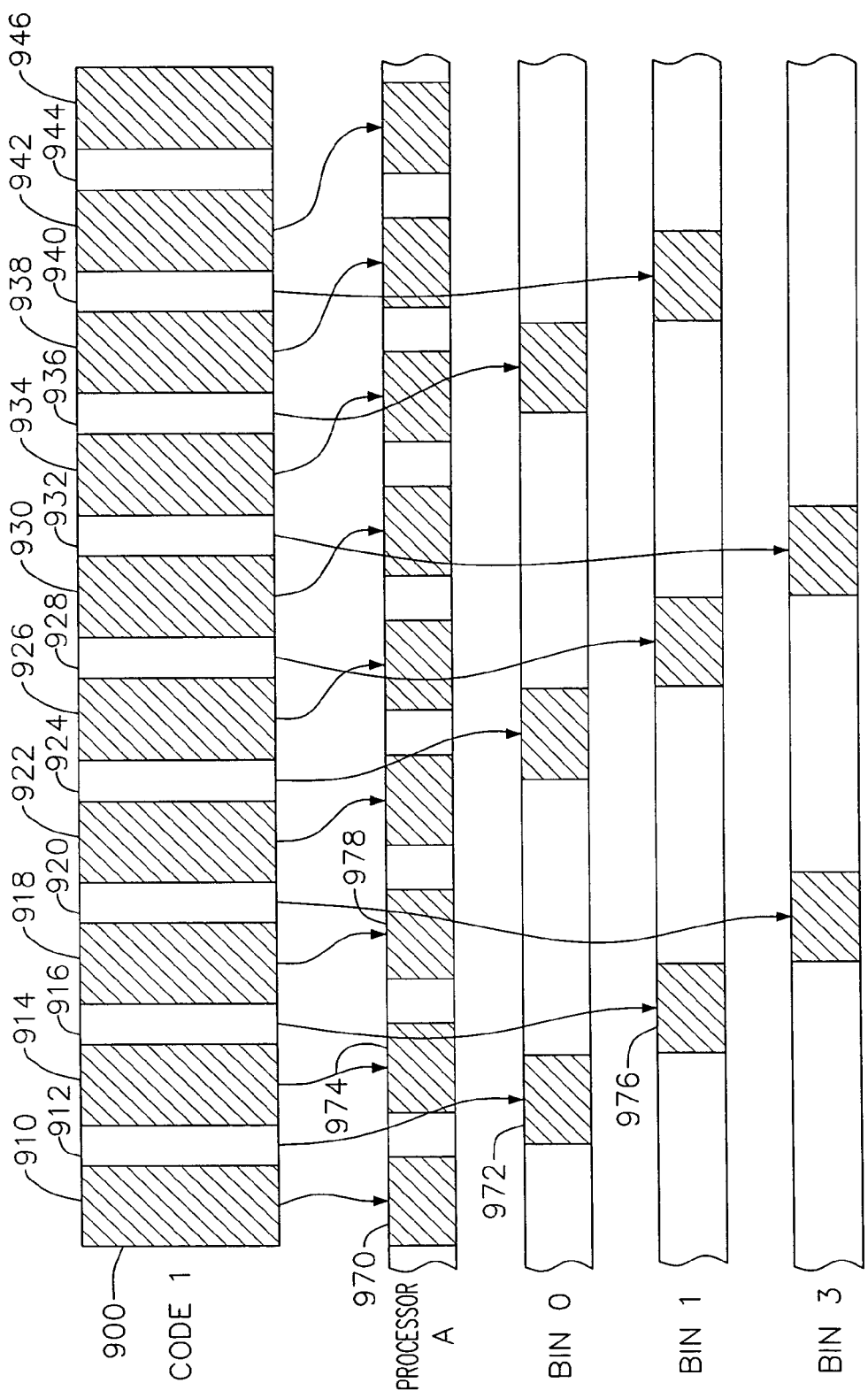

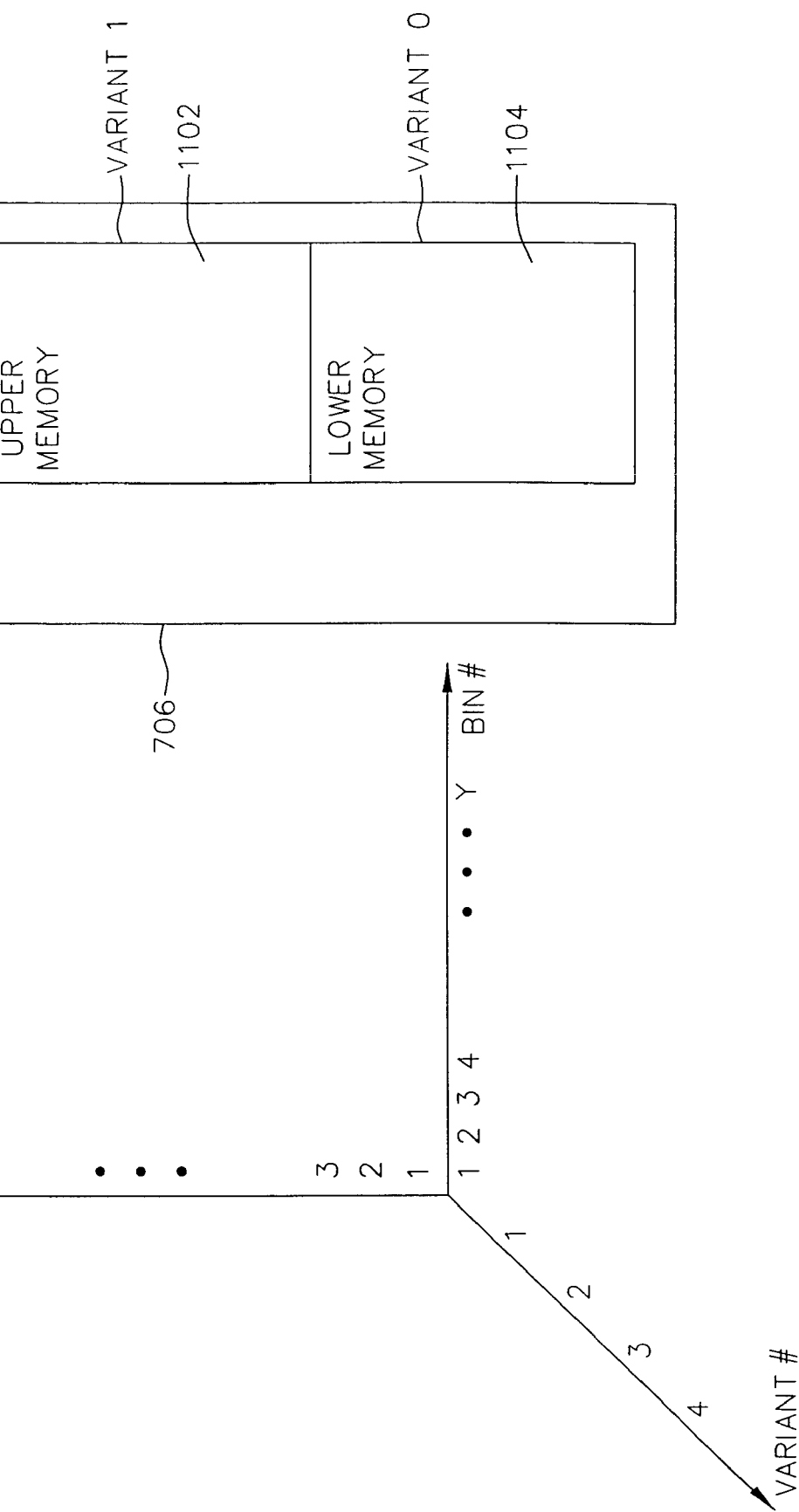

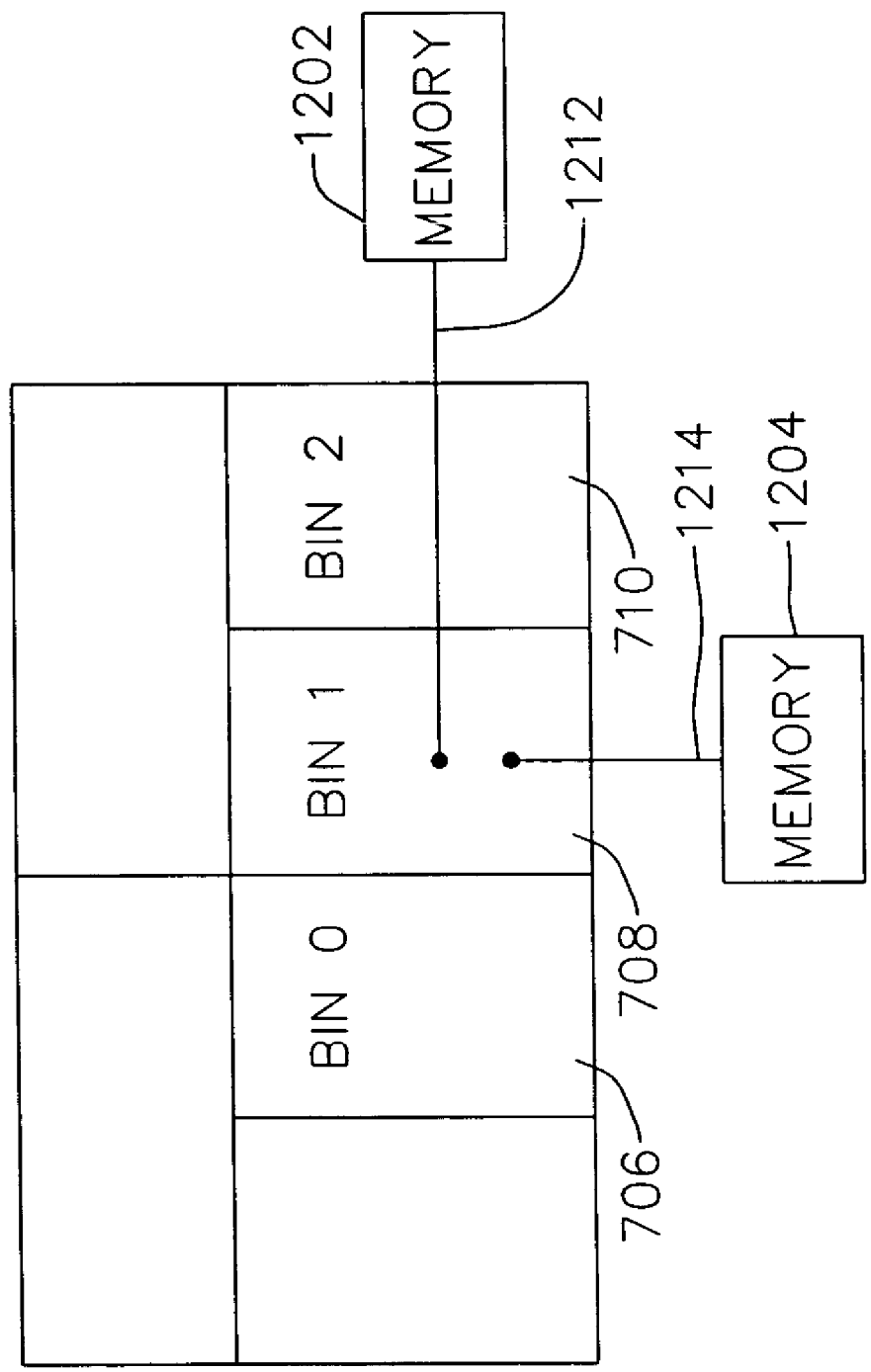

FIG. 18

| HARDWARE ID | STATE | BIN | DMA PENDING | UNIT DONE |
|---|---|---|---|---|
|  |  |  |  |  |
|  |  |  |  |  |
| 3 | 4 | 3 | 1 | 0 |
|  |  |  |  |  |

SYSTEM AND METHOD FOR EXECUTING HYBRIDIZED CODE ON A DYNAMICALLY CONFIGURABLE HARDWARE ENVIRONMENT

CROSS-REFERENCE TO RELATED APPLICATION(S)

This application is a continuation of application Ser. No. 09/608,860 filed Jun. 30, 2000, now issued as U.S. Pat. No. 6,675,289, the disclosure of which is incorporated fully herein by reference.

FIELD OF THE INVENTION

The present invention relates to the field of software run time operating systems. In particular, the present invention relates to a system and method for executing software code in a dynamically configurable hardware environment.

BACKGROUND OF THE INVENTION

The software which executes upon processors is a sequence of digital words known as machine code. This machine code is understandable by the hardware of the processors. However, programmers typically write programs in a higher-level language which is much easier for humans to comprehend. The program listings in this higher-level language are called source code. In order to convert the human-readable source code into machine-readable machine code, several special software tools are known in the art. These software tools are compilers, linkers, assemblers, and loaders.

Existing compilers, linkers, and assemblers prepare source code well in advance of their being executed upon processors. These software tools expect that the hardware upon which the resulting machine code executes, including processors, will be in a predetermined and fixed configuration for the duration of the software execution. If a flexible processing methodology were invented, then the existing software tools would be inadequate to support processors and other hardware lacking a predetermined and flexed configuration.

Furthermore, once the software was prepared using replacements for these software tools, the existing run time operating systems would not be sufficient to execute the resulting software in a flexible processing environment.

SUMMARY OF THE INVENTION

A method and apparatus for processing a plurality of threads of program code is disclosed. In one embodiment, the method begins by retrieving a first kernel code segment. Then the method may identify a first set of configuration information required to execute the first kernel code segment. The method then may build an entry in a kernel code execution table utilizing the first kernel code segment and the first configuration information. The method may then select a first accelerator set configured to execute said first kernel code segment; and initiate a direct memory access transfer to the first accelerator set.

BRIEF DESCRIPTION OF THE DRAWINGS

The features, aspects, and advantages of the present invention will become more fully apparent from the following detailed description, appended claims, and accompanying drawings in which:

FIG. 8 is a diagram of the contents of an exemplary run time kernel (RTK), according to one embodiment.

FIG. 9B is a process chart showing the allocation of the kernel segments of FIG. 9A into multiple bins.

FIG. 10 is an exemplary TAPR table, according to one embodiment.

FIG. 11 is a diagram of a first exemplary variant of a design, according to one embodiment.

FIG. 12 is a diagram of a second exemplary variant of a design, according to another embodiment.

FIG. 18 is a table to support the operation of the RTK processor, according to one embodiment.

DETAILED DESCRIPTION OF THE INVENTION

In the following description, numerous specific details are set forth to provide a thorough understanding of the present invention. However, one having an ordinary skill in the art may be able to practice the invention without these specific details. In some instances, well-known circuits, structures, and techniques have not been shown in detail to not unnecessarily obscure the present invention.

Figure 1:
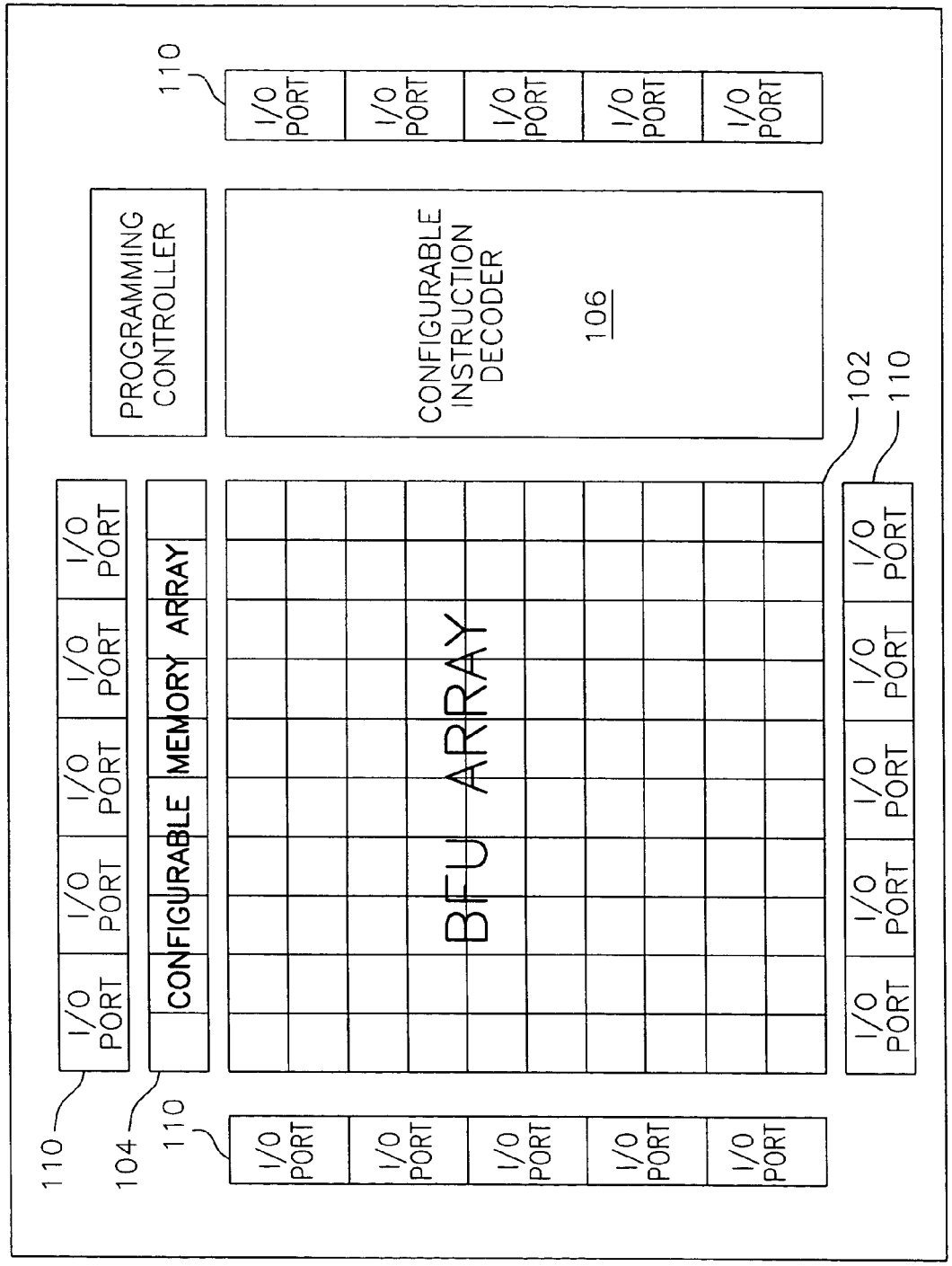
FIG. 1 is the overall chip architecture of one embodiment. This chip architecture comprises many highly integrated components.

FIG. 1 is the overall chip architecture of one embodiment. This chip architecture comprises many highly integrated components. While prior art chip architectures fix resources at fabrication time, specifically instruction source and distribution, the chip architecture of the present invention is flexible. This architecture uses flexible instruction distribution that allows position independent configuration and control of a number of multiple context processing elements (MCPEs) resulting in superior performance provided by the MCPEs. The flexible architecture of the present invention uses local and global control to provide selective configuration and control of each MCPE in an array; the selective configuration and control occurs concurrently with present function execution in the MCPEs.

The chip of one embodiment of the present invention is composed of, but not limited to, a 10×10 array of identical eight-bit functional units, or MCPEs 102, which are connected through a reconfigurable interconnect network. The MCPEs 102 serve as building blocks out of which a wide variety of computing structures may be created. The array size may vary between 2×2 MCPEs and 16×16 MCPEs, or even more depending upon the allowable die area and the desired performance. A perimeter network ring, or a ring of network wires and switches that surrounds the core array, provides the interconnections between the MCPEs and perimeter functional blocks.

Surrounding the array are several specialized units that may perform functions that are too difficult or expensive to decompose into the array. These specialized units may be coupled to the array using selected MCPEs from the array. These specialized units can include large memory blocks called configurable memory blocks 104. In one embodiment these configurable memory blocks 104 comprise eight blocks, two per side, of 4 kilobyte memory blocks. Other specialized units include at least one configurable instruction decoder 106.

Furthermore, the perimeter area holds the various interfaces that the chip of one embodiment uses to communicate with the outside world including: input/output (I/O) ports; a peripheral component interface (PCI) controller, which may be a standard 32-bit PCI interface; one or more synchronous but static random access memory (SRAM) controllers; a programming controller that is the boot-up and master control block for the configuration network; a master clock input and phase-locked loop (PLL) control/configuration; a Joint Test Action Group (JTAG) test access port connected to all the serial scan chains on the chip; and I/O pins that are the actual pins that connect to the outside world.

Two concepts which will be used to a great extent in the following description are context and configuration. Generally, "context" refers to the definition of what hardware registers in the hardware perform which function at a given point in time. In different contexts, the hardware may perform differently. A bit or bits in the registers may define which definition is currently active. Similarly, "configuration" usually refers to the software bits that command the hardware to enter into a particular context. This set of software bits may reside in a register and define the hardware's behavior when a particular context is set.

Figure 2:
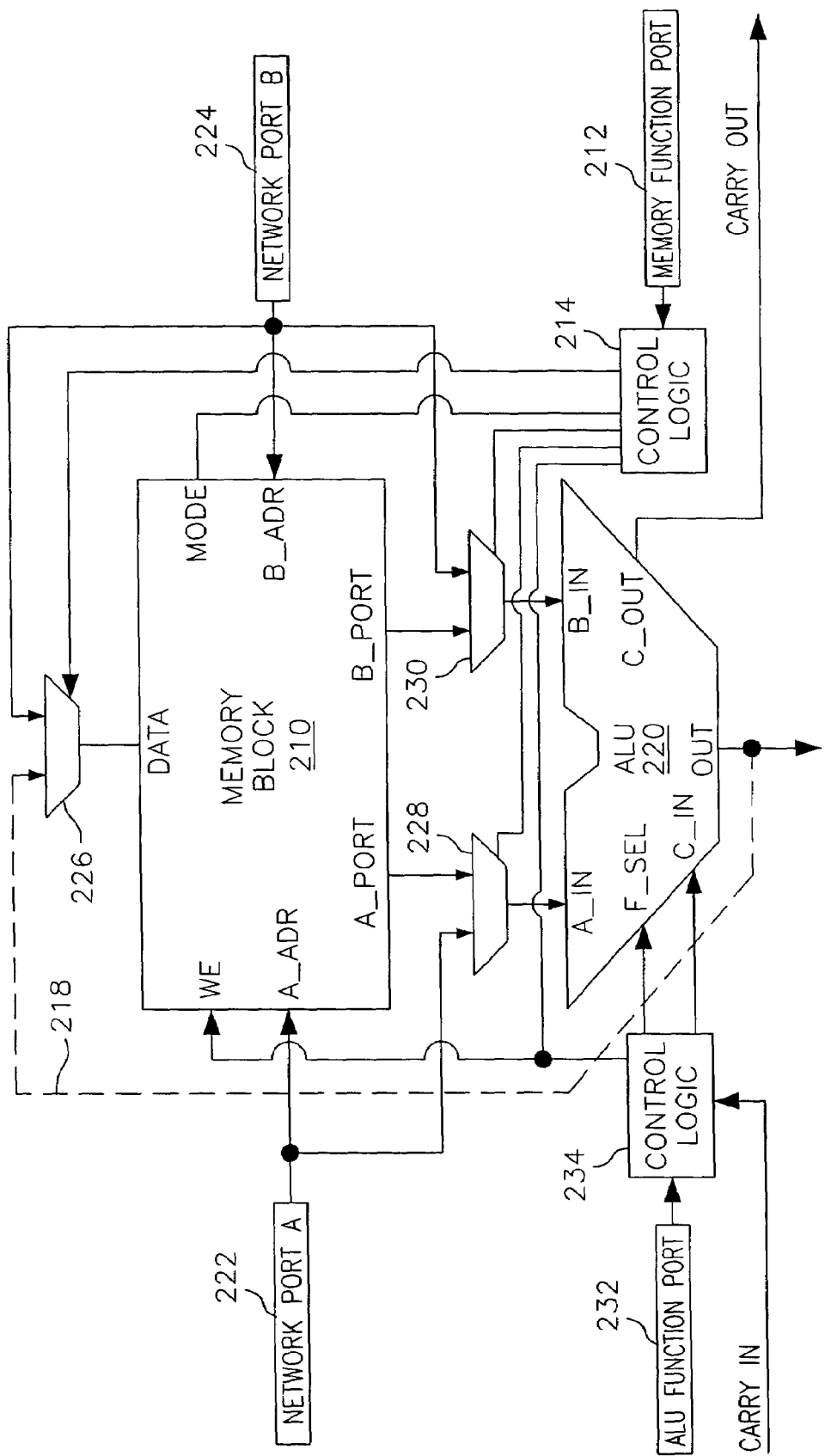
FIG. 2 is an eight bit multiple context processing element (MCPE) core of one embodiment of the present invention.

FIG. 2 is an eight bit MCPE core of one embodiment of the present invention. Primarily the MCPE core comprises memory block 210 and basic ALU core 220. The main memory block 210 is a 256 word by eight bit wide memory, which is arranged to be used in either single or dual port modes. In dual port mode the memory size is reduced to 128 words in order to be able to perform two simultaneous read operations without increasing the read latency of the memory. Network port A 222, network port B 224, ALU function port 232, control logic 214 and 234, and memory function port 212 each have configuration memories (not shown) associated with them. The configuration memories of these elements are distributed and are coupled to a Configuration Network Interface (CNI) (not shown) in one embodiment. These connections may be serial connections but are not so limited. The CNI couples all configuration memories associated with network port A 222, network port B 224, ALU function port 232, control logic 214 and 234, and memory function port 212 thereby controlling these configuration memories. The distributed configuration memory stores configuration words that control the configuration of the interconnections. The configuration memory also stores configuration information for the control architecture. Optionally it can also be a multiple context memory that receives context selecting signals which have been broadcast globally and locally from a variety of sources.

Figure 3:
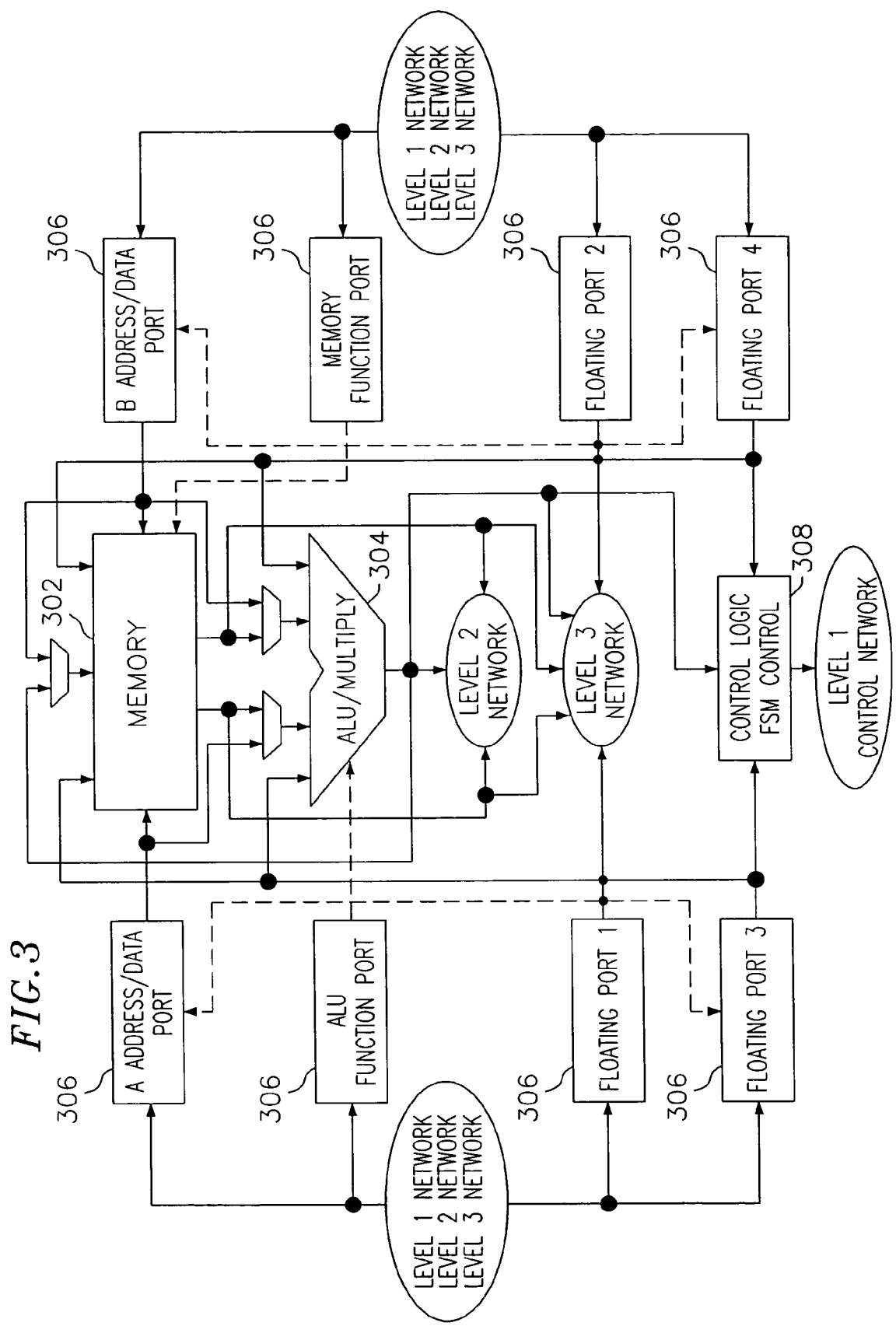
FIG. 3 is a data flow diagram of the MCPE of one embodiment.

FIG. 3 is a data flow diagram of the MCPE of one embodiment. The structure of each MCPE allows for a great deal of flexibility when using the MCPEs to create networked processing structures. The major components of the MCPE include static random access memory (SRAM) main memory 302, ALU with multiplier and accumulate unit 304, network ports 306, and control logic 308. The solid lines mark data flow paths while the dashed lines mark control paths; all of the lines are one or more bits wide in one embodiment. There is a great deal of flexibility available within the MCPE because most of the major components may serve several different functions depending on the MCPE configuration.

The MCPE main memory 302 is a group of 256 eight bit SRAM cells that can operate in one of four modes. It takes in up to two eight bit addresses from A and B address/data ports, depending upon the mode of operation. It also takes in up to four bytes of data, which can be from four floating ports, the B address/data port, the ALU output, or the high byte from the multiplier. The main memory 302 outputs up to four bytes of data. Two of these bytes, memory A and B, are available to the MCPE's ALU and can be directly driven onto the level 2 network. The other two bytes, memory C and D, are only available to the network. The output of the memory function port 306 controls the cycle-by-cycle operation of the memory 302 and the internal MCPE data paths as well as the operation of some parts of the ALU 304 and the control logic 308. The MCPE main memory may also be implemented as a static register file in order to save power.

Each MCPE contains a computational unit 304 comprised of three semi-independent functional blocks. The three semi-independent functional blocks comprise an eight bit wide ALU, an 8×8 to sixteen bit multiplier, and a sixteen bit accumulator. The ALU block, in one embodiment, performs logical, shift, arithmetic, and multiplication operations, but is not so limited. The ALU function port 306 specifies the cycle-by-cycle operation of the computational unit. The computational units in orthogonally adjacent MCPEs can be chained to form wider-word data paths.

The MCPE network ports 306 connect the MCPE network to the internal MCPE logic (memory, ALU, and control). There are eight network ports 306 in each MCPE, each serving a different set of purposes. The eight network ports 306 comprise two address/data ports, two function ports, and four floating ports. The two address/data ports feed addresses and data into the MCPE memories and ALU. The two function ports feed instructions into the MCPE logic. The four floating ports may serve multiple functions. The determination of what function they are serving is made by the configuration of the receivers of their data.

The MCPEs of one embodiment are the building blocks out of which more complex processing structures may be created. The structure that joins the MCPE cores into a complete array in one embodiment is actually a set of several mesh-like interconnect structures. Each interconnect structure forms a network, and each network is independent in that it uses different paths, but the networks do join at the MCPE input switches. The network structure of one embodiment of the present invention is comprised of a local area broadcast network (level 1), a switched interconnect network (level 2), a shared bus network (level 3), and a broadcast, or configuration, network.

Figure 4:
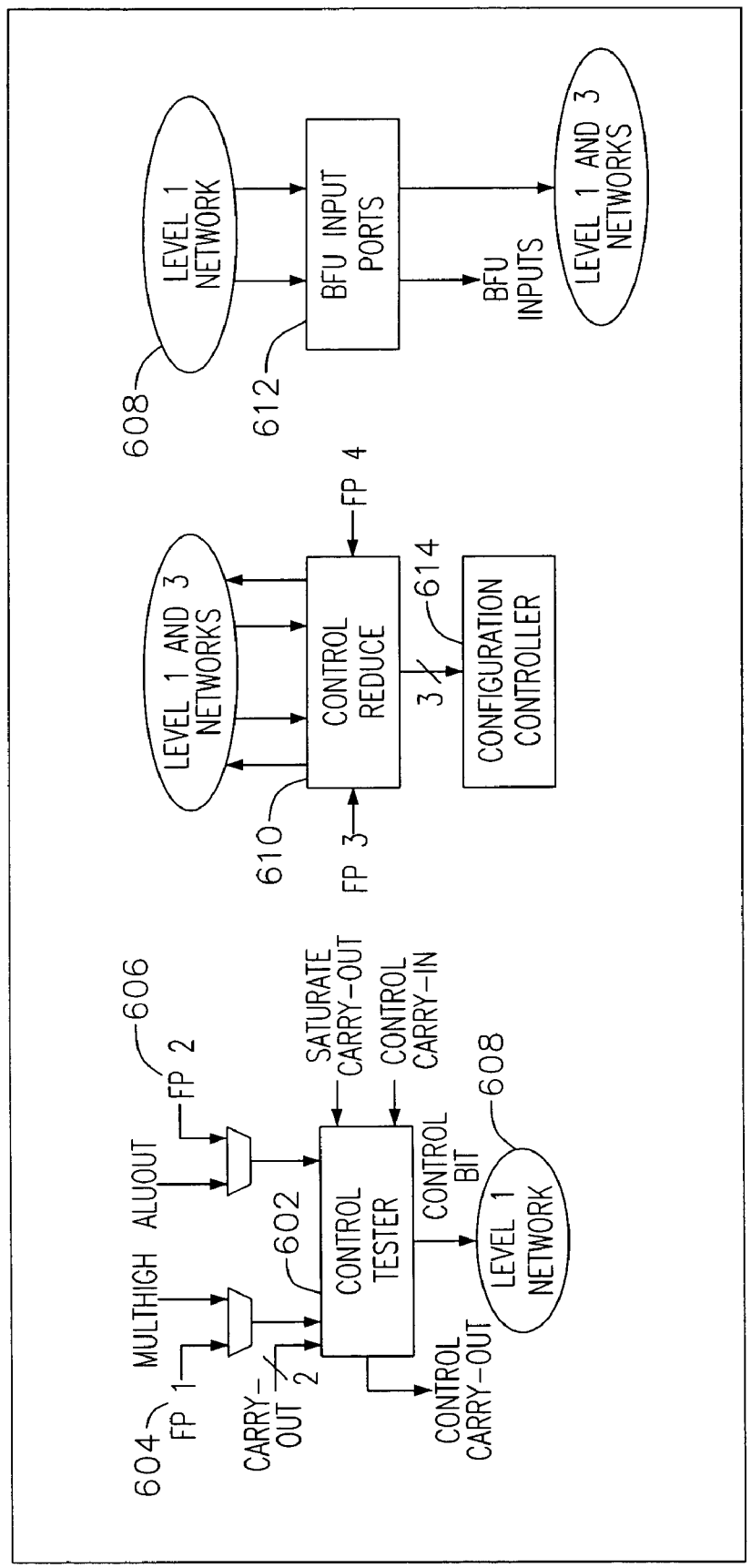
FIG. 4 shows the major components of the MCPE control logic structure of one embodiment.

FIG. 4 shows the major components of the MCPE control logic structure of one embodiment. The Control Tester 602 takes the output of the ALU for two bytes from floating ports 604 and 606, plus the left and right carryout bits, and performs a configurable test on them. The result is one bit indicating that the comparison matched. This bit is referred to as the control bit. This Control Tester 602 serves two main purposes. First, it acts as a programmable condition code generator testing the ALU output for any condition that the application needs to test for. Secondly, since these control bits can be grouped and sent out across the level 2 and 3 networks, this unit can be used to perform a second or later stage reduction on a set of control bits/data generated by other MCPE's.

The level 1 network 608 carries the control bits. The level 1 network 608 consists of direct point-to-point communications between every MCPE and its 12 nearest neighbors. Thus, each MCPE will receive 13 control bits (12 neighbors and it's own) from the level 1 network. These 13 control bits are fed into the Control Reduce block 610 and the BFU input ports 612. The Control Reduce block 610 allows the control information to rapidly effect neighboring MCPEs. The MCPE input ports allow the application to send the control data across the normal network wires so they can cover long distances. In addition the control bits can be fed into MCPEs so they can be manipulated as normal data.

The Control Reduce block 610 performs a simple selection on either the control words coming from the level 1 control network, the level 3 network, or two of the floating ports. The selection control is part of the MCPE configuration. The Control Reduce block 610 selection results in the output of five bits. Two of the output bits are fed into the MCPE configuration controller 614. One output bit is made available to the level 1 network, and one output bit is made available to the level 3 network.

The MCPE configuration controller 614 selects on a cycle-by-cycle basis which context, major or minor, will control the MCPE's activities. The controller consists of a finite state machine (FSM) that is an active controller and not just a lookup table. The FSM allows a combination of local and global control over time that changes. This means that an application may run for a period based on the local control of the FSM while receiving global control signals that reconfigure the MCPE, or a block of MCPEs, to perform different functions during the next clock cycle. The FSM provides for local configuration and control by locally maintaining a current configuration context for control of the MCPE. The FSM provides for global configuration and control by providing the ability to multiplex and change between different configuration contexts of the MCPE on each different clock cycle in response to signals broadcast over a network. This configuration and control of the MCPE is powerful because it allows an MCPE to maintain control during each clock cycle based on a locally maintained configuration context while providing for concurrent global on-the-fly reconfiguration of each MCPE. This architecture significantly changes the area impact and characterization of an MCPE array while increasing the efficiency of the array without wasting other MCPEs to perform the configuration and control functions.

Figure 5:
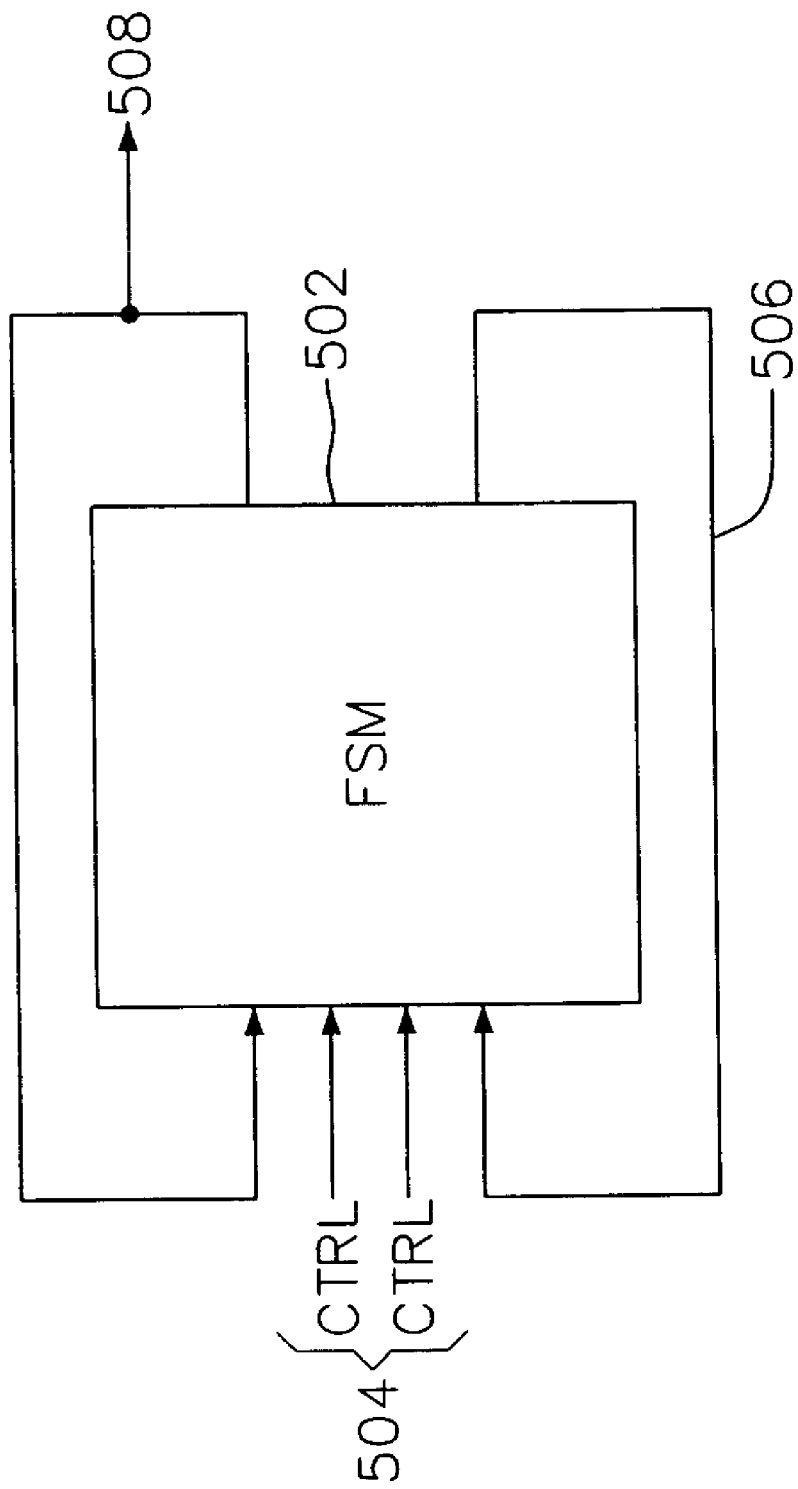
FIG. 5 is the finite state machine (FSM) of the MCPE configuration controller of one embodiment.

FIG. 5 is the FSM 502 of the MCPE configuration controller of one embodiment. In controlling the functioning of the MCPE, control information 504 is received by the FSM 502 in the form of state information from at least, one surrounding MCPE in the networked array. This control information is in the form of two bits received from the Control Reduce block of the MCPE control logic structure. In one embodiment, tile FSM 502 also has three state bits that directly control the major and minor configuration contexts for the particular MCPE. The FSM 502 maintains the data of the current MCPE configuration by using a feedback path 506 to feed back the current configuration state of the MCPE of the most recent clock cycle. The feedback path 506 is not limited to a single path. The FSM 502 selects one of the available configuration memory contexts for use by the corresponding MCPE during the next clock cycle in response to the received state information from the surrounding MCPEs and the current configuration data. This selection is output from the FSM 502 in the form of a configuration control signal 508. The selection of a configuration memory context for use during the next clock cycle occurs, in one embodiment, during the execution of the configuration memory context selected for the current clock cycle.

Figure 6:
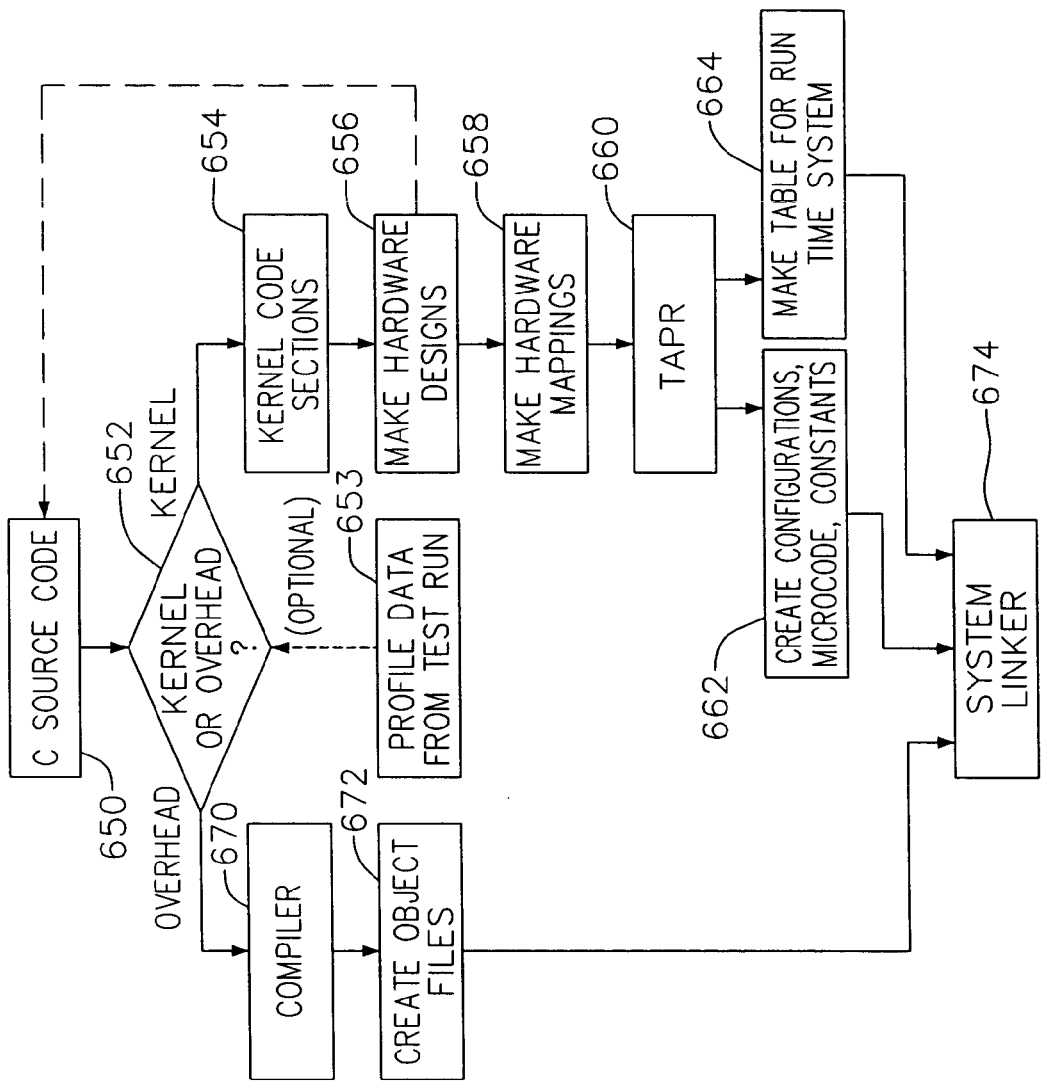
FIG. 6 is a data flow system diagram of the preparation of run time systems tables by the temporal automatic place and route (TAPR) of one embodiment.

FIG. 6 is a data flow system diagram of the preparation of run time systems tables by the temporal automatic place and route (TAPR) of one embodiment. In step 650 an application program in source code is selected. In the FIG. 6 embodiment the application program is written in a procedural oriented language, C, but in other embodiments the application program could be written in another procedural oriented language, in an object oriented language, or in a dataflow language.

The source code of step 650 is examined in decision step 652. Portions of the source code are separated into overhead code and kernel code sections. Kernel code sections are defined as those routines in the source code which may be advantageously executed in a hardware accelerator. Overhead code is defined as the remainder of the source code after all the kernel code sections, are identified and removed.

In one embodiment, the separation of step 652 is performed by a software profiler. The software profiler breaks the source code into functions. In one embodiment, the complete source code is compiled and then executed with a representative set of test data. The profiler monitors the timing of the execution, and then based upon this monitoring determines the function or functions whose execution consumes a significant portion of execution time. Profiler data from this test run may be sent to the decision step 652. The profiler identifies these functions as kernel code sections.

In an alternate embodiment, the profiler examines the code of the functions and then identifies a small number of functions that are anticipated to consume a large portion of the execution runtime of the source code. These functions may be identified by attributes such as having a regular structure, having intensive mathematical operations, having a repeated or looped structure, and having a limited number of inputs and outputs. Attributes which argue against the function being identified as kernel sections include numerous branches and overly complex control code.

In an alternate embodiment, the compiler examines the code of the functions to determine the size of arrays traversed and the number of variables that are live during the execution of a particular block or function. Code that has less total memory used than that in the hardware accelerators and associated memories are classified as kernel code sections. The compiler may use well-understood optimization methods such as constant propagation, loop induction, in-lining and intra-procedural value range analysis to infer this information from the source code.

Those functions that are identified as kernel code section by one of the above embodiments of profiler, are then labeled, in step 654, as kernel code sections. The remainder of the source code is labeled as overhead code. In alternate embodiments, the separation of step 652 may be performed manually by a programmer.

In step 656, the FIG. 6 process creates hardware designs for implementing the kernel code sections of step 654. These designs are the executable code derived from the source code of the kernel code sections. Additionally, the designs contain any necessary microcode or other fixed constant values required in order to run the executable code on the target hardware. The designs are not compiled in the traditional sense. Instead they are created by the process of step 656 which allows for several embodiments.

In one embodiment, the source code of the kernel code section is compiled automatically by one of several compilers corresponding to the available hardware accelerators. In an alternate embodiment, a programmer may manually realize the executable code from the source code of the kernel code sections, as shown by the dashed line from step 656 to step 650. In a third embodiment the source code of the kernel code sections is compiled automatically for execution on both the processors and the hardware accelerators, and both versions are loaded into the resulting binary. In a fourth embodiment, a hardware accelerator is synthesized into a custom hardware accelerator description.

In step 658 the hardware designs of step 656 are mapped to all available target hardware. The target hardware may be a processor, an MCPE, or a defined set of MCPEs called a bin. A bin may contain any number of MCPEs from one to the maximum number of MCPEs on a given integrated circuit. However, in one embodiment a quantity of 12 MCPEs per bin is used. The MCPEs in each bin may be geometrically neighboring MCPEs, or the MCPEs may be distributed across the integrated circuit. However, in one embodiment the MCPEs of each bin are geometrically neighboring.

In the temporal automatic place and route (TAPR) of step 660, the microcode created in step 656 may be segmented into differing context-dependent portions. For example, a given microcode design may be capable of loading and executing in either lower memory or upper memory of a given bin. The TAPR of step 660 may perform the segmentation in several different ways depending upon the microcode. If, for example, the microcode is fiat, then the microcode may only be loaded into memory in one manner. Here no segmentation is possible. Without segmentation one microcode may not be background loaded onto a bin's memory. The bin must be stalled and the microcode loaded off-line.

In another example, memory is a resource which may be controlled by the configuration. It is possible for the TAPR of step 660 to segment microcode into portions, corresponding to differing variants, which correspond to differing contexts. For example, call one segmented microcode portion context 2 and another one context 3. Due to the software separation of the memory of the bin it would be possible to place the context 2 and context 3 portions into lower memory and upper memory, respectively. This allows background loading of one portion while another portion is executing.

The TAPR of step 660 supports two subsequent steps in the preparation of the source code for execution. In step 664, a table is prepared for subsequent use by the run time system. In one embodiment, the table of step 664 contains all of the three-tuples corresponding to allowable combinations of designs (from step 656), bins, and variants. A variant of a design or a bin is any differing implementation where the functional inputs and the outputs are identical when viewed from outside. The variants of step 664 may be variants of memory separation, such as the separation of memory into upper and lower memory as discussed above. Other variants may include differing geometric layouts of MCPEs within a bin, causing differing amounts of clock delays being introduced into the microcodes, and also whether or not the MCPEs within a bin are overlapping. In each case a variant performs a function whose inputs and outputs are identical outside of the function. The entries in the table of step 664 point to executable binaries, each of which may each be taken and executed without further processing at run time. The table of step 664 is a set of all alternative execution methods available to the run time system for a given kernel section.

The other step supported by the TAPR of step 660 is the creation of configurations, microcodes, and constants of step 662. These are the executable binaries which are pointed to by the entries in the table of step 664.

Returning now to decision step 652, the portions of the source code which were previously deemed overhead are sent to a traditional compiler 670 for compilation of object code to be executed on a traditional processor. Alternately, the user may hand code the source program into the assembly language of the target processor. The overhead C code may also be nothing more than calls to kernel sections. The object code is used to create object code files at step 672. Finally, the object code files of step 672, the configurations, microcode, and constants of step 662, and table of step 664 are placed together in a format usable by the run time system by the system linker of step 674. Note that the instructions for the process of FIG. 6 may be described in software contained in a machine-readable medium. A machine-readable medium includes any mechanism for storing or transmitting information in a form readable by a machine (e.g. a computer). For example, a machine-readable medium includes read only memory (ROM); random access memory (RAM); magnetic disk storage media; optical storage media; flash memory devices; and electrical, optical, acoustical, or other form of propagated signals (e.g. carrier waves, infrared signals, digital signals, etc.).

Figure 7A:
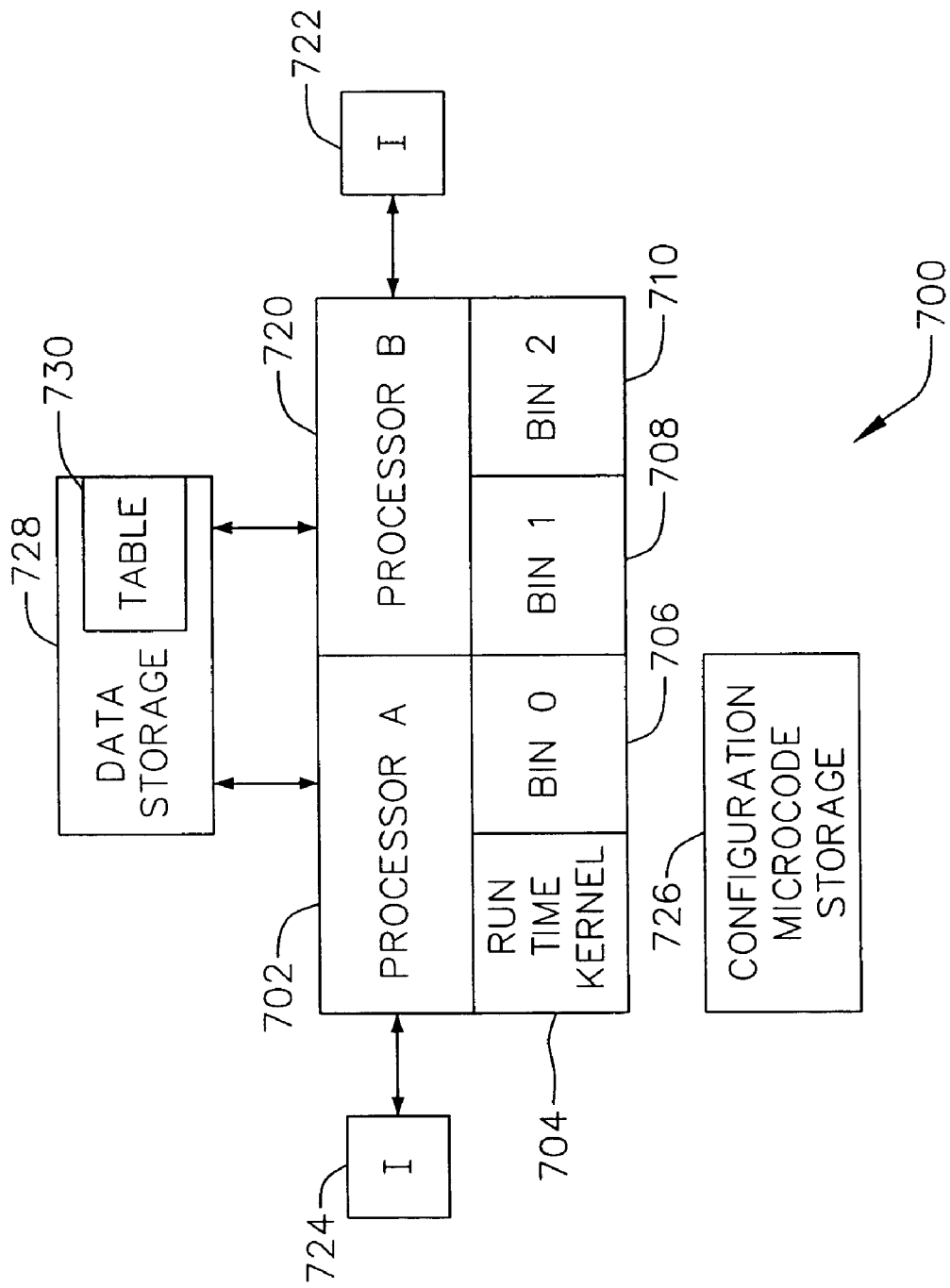
FIG. 7A is a block diagram of exemplary MCPEs, according to one embodiment.

FIG. 7A is a block diagram of exemplary MCPEs, according to one embodiment. Chip architecture 700 includes processing elements processor A 702, processor B 720, bin 0 706, bin 1 708, and bin 2 710. In the FIG. 7A embodiment, the function of hardware accelerator may be assigned to the MCPEs, either individually or grouped into bins. A run-time kernel (RTK) 704 apportions the executable software among these processing elements at the time of execution. In the FIG. 7A embodiment, processor A 702 or processor B 720 may execute the overhead code identified in step 652 and created as object files in step 672 of the FIG. 6 process. Bin 0 706, bin 1 708, and bin 2 710 may execute the kernel code identified in step 652.

Each processing element processor A 702 and processor B 720 is supplied with an instruction port, instruction port 724 and instruction port 722, respectively, for fetching instructions for execution of overhead code.

Bin 0 706, bin 1 708, and bin 2 710 contain several MCPEs. In one embodiment, each bin contains 12 MCPEs. In alternate embodiments, the bins could contain other numbers of MCPEs, and each bin could contain a different number of MCPEs than the other bins.

In the FIG. 7A embodiment, bin 0 706, bin 1 708, and bin 2 710 do not share any MCPEs, and are therefore called non-overlapping bins. In other embodiments, bins may share MCPEs. Bins which share MCPEs are called overlapping bins.

RTK 704 is a specialized microprocessor for controlling the configuration of chip architecture 700 and controlling the loading and execution of software in bin 0 706, bin 1 708, and bin 2 710. In one embodiment, RTK 704 may move data from data storage 728 and configuration microcode from configuration microcode storage 726 into bin 0 706, bin 1 708, and bin 2 710 in accordance with the table 730 stored in a portion of data storage 728. In alternate embodiments, RTK 704 may move data from data storage 728, without moving any configuration microcode from configuration microcode storage 726. Table 730 is comparable to that table created in step 664 discussed in connection with FIG. 6 above.

Paragraph #2A:
The RTK may also move data to and from IO port NNN and IO port MMM into the data memory 728.
[If I didn't comment earlier, the RTK does not move data to processor A or processor B—page 19 line 2]

Figure 7B:
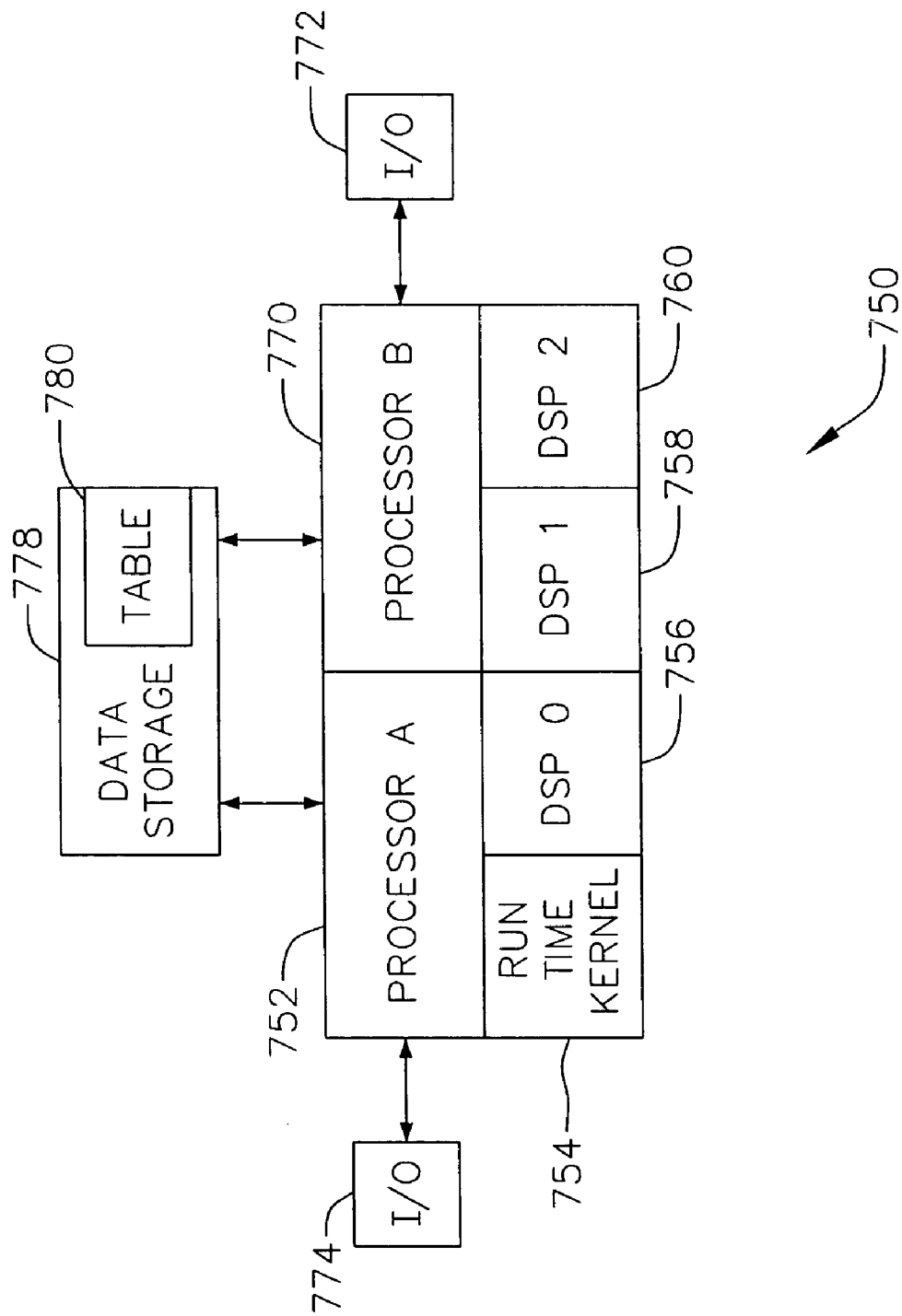
FIG. 7B is a block diagram of exemplary digital signal processors (DSP), according to one embodiment.

FIG. 7B is a block diagram of exemplary digital signal processors (DSP), according to one embodiment. Chip architecture 750 includes processing elements processor A 752, processor B 770, DSP 0 756, DSP 1 758, and DSP 2 760. In the FIG. 7B embodiment, the function of hardware accelerator may be assigned to the DSPs. In other embodiments, DSP 0 756, DSP 1 758, and DSP 2 760 may be replaced by other forms of processing cores. A run-time kernel (RTK) 754 apportions the executable software among these processing elements at the time of execution.

In the FIG. 7B embodiment, processor A 752 or processor B 770 may execute the overhead code identified in step 652 and created as object files in step 672 of the FIG. 6 process. DSP 0 756, DSP 1 758, and DSP 2 760 may execute the kernel code identified in step 652. Each processing element processor A 702 and processor B 720 is supplied with an instruction port, instruction port 724 and instruction port 722, respectively, for fetching instructions for execution of overhead code.

One difference between the FIG. 7A and FIG. 7B embodiments is that the FIG. 7B embodiment lacks an equivalent to the configuration microcode storage 726 of FIG. 7A. No configuration microcode is required as the DSPs of FIG. 7B have a fixed instruction set (microcode) architecture.

RTK 754 is a specialized microprocessor for controlling the configuration of chip architecture 750 and controlling the loading and execution of software in DSP 0 756, DSP 1 758, and DSP 2 760. In one embodiment, RTK 754 may move data from data storage 778 into DSP 0 756, DSP 1 758, and DSP 2 760 in accordance with the table 780 stored in a portion of data storage 778. Table 780 is comparable to that table created in step 664 discussed in connection with FIG. 6 above.

FIG. 8 is a diagram of the contents of an exemplary run time kernel (RTK) 704, according to one embodiment. RTK 704 contains several functions in microcontroller form. In one embodiment, these functions include configuration direct memory access (DMA) 802, microcode DMA 804, arguments DMA 806, results DMA 808, and configuration network source 810. RTK 704 utilizes these functions to manage the loading and execution of kernel code and overhead code on chip architecture 700. Configuration DMA 802, microcode DMA 804, arguments DMA 806, and results DMA 808 each comprise a simple hardware engine for reading from one memory and writing to another.

Configuration DMA 802 writes configuration data created by the TAPR 660 in step 622 of the FIG. 6 process. This configuration data configures a bin to implement the behavior of the kernel code section determined in the table-making step 664 of FIG. 6. The configuration data transfers are under the control of RTK 704 and the configuration data itself is entered in table 730. Configuration data is unchanged over the execution of the hardware accelerator.

Microcode DMA 804 writes microcode data for each configuration into the bins. This microcode further configures the MCPEs with instruction data that allows the function of the hardware accelerator to be changed on a cycle-by-cycle basis while the hardware accelerator is executing. Each bin may have multiple microcode data sets available for use. Microcode data is stored in the configuration microcode storage 726 and written into memory within the MCPEs of each bin by microcode DMA 804.

Arguments DMA 806 and results DMA 808 set up transfers of data from data memory 728 into one of the bins bin 0 706, bin 1 708, or bin 2 710. Argument data are data stored in a memory by a general purpose processor which requires subsequent processing in a hardware accelerator. The argument data may be considered the input data of the kernel code sections executed by the bins. Results data are data sent from the hardware accelerator to the general purpose processor as the end product of a particular kernel code section's execution in a bin. The functional units arguments DMA 806 and results DMA 808 transfer this data without additional processor intervention.

Configuration network source 810 controls the configuration network. The configuration network effects the configuration of the MCPEs of the bins bin 0 706, bin 1 708 and bin 2 710, and of the level 1, level 2, and level 310 interconnect described in FIG. 3 and FIG. 4. Configuration of the networks enables the RTK to control the transfer of configuration data, microcode data, arguments data, and results data amongst the data memory 728, configuration memory 726, and the MCPEs of bin 0 706, bin 1 708 and bin 2 710.

In cases where there are multiple contexts, RTK 704 may perform background loading of microcode and other data while the bins are executing kernel code. An example of this is discussed below in connection with FIG. 11.

Figure 9A:
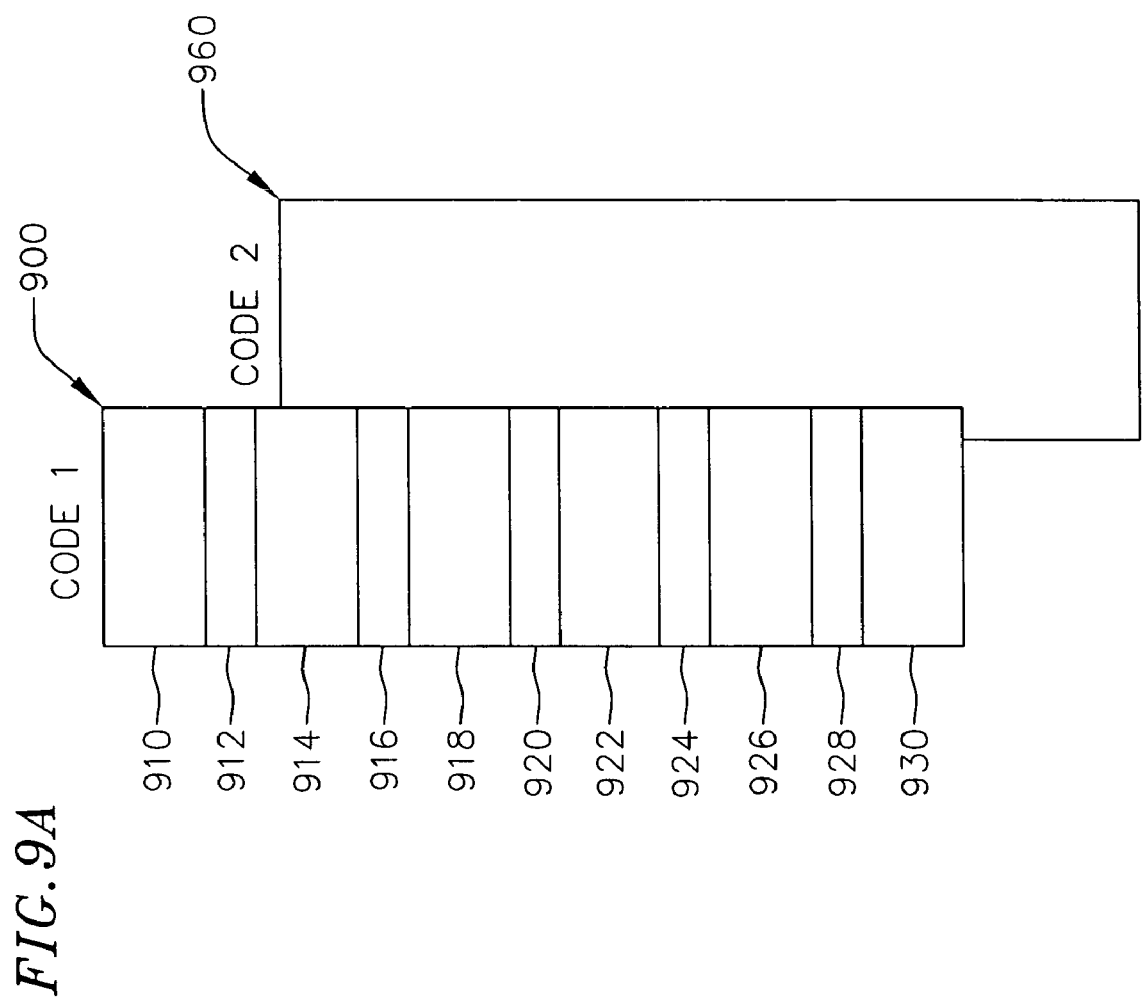
FIG. 9A is a process chart showing the mapping of an exemplary single threaded process into kernel segments, according to one embodiment.

FIG. 9A is a process chart showing the mapping of an exemplary single threaded process into kernel segments, according to one embodiment. Source code 1 900 and source code 2 960 are two exemplary single threaded processes which may be used as the C source code 650 of the FIG. 6 process. In one embodiment, source code 1 900 may contain overhead code 910, 914, 918, 922, 926, and 930, as well as kernel code 912, 916, 920, 924, and 928. The identification of the overhead code and kernel code sections may be performed in step 652 of the FIG. 6 process. Overhead code 910, 914, 918, 922, 926, and 930 may be executed in processor A 702 or processor B 720 of the FIG. 7a embodiment. Kernel code 912, 916, 920, 924, and 928 may be executed in bin 0 706, bin 1 708, or bin 2 710 of the FIG. 7a embodiment. The TAPR 660 of the FIG. 6 process may create the necessary configurations and microcode for the execution of the kernel code 912, 916, 920, 924, and 928.

FIG. 9B is a process chart showing the allocation of the kernel segments of FIG. 9A into multiple bins. Utilizing the table 780 produced in step 664 of the FIG. 6 process, RTK 704 may load and execute the overhead code 910, 914, 918, 922, 926, and 930 and the kernel code 912,916, 920, 924, and 928 into an available processor or bin as needed. In the exemplary FIG. 9B embodiment, RTK 704 loads the first overhead code 910 into processor A 702 for execution during time period 970. RTK 704 then loads the first kernel code 912 into bin 0 706 for execution during time period 972.

Depending upon whether overhead code 914 requires the completion of kernel code 912, RTK 704 may load overhead code 914 into processor A 702 for execution during time period 974. Similarly, depending upon whether kernel code 916 requires the completion of overhead code 914 or kernel code 910, RTK 704 may load kernel code 916 into bin 1 708 for execution during time period 976.

Depending upon requirements for completion, RTK 704 may continue to load and execute the overhead code and kernel code in an overlapping manner in the processors and the bins. When overhead code or kernel code require the completion of a previous overhead code or kernel code, RTK 704 may load the subsequent overhead code or kernel code but delay execution until the required completion.

Figure 9C:
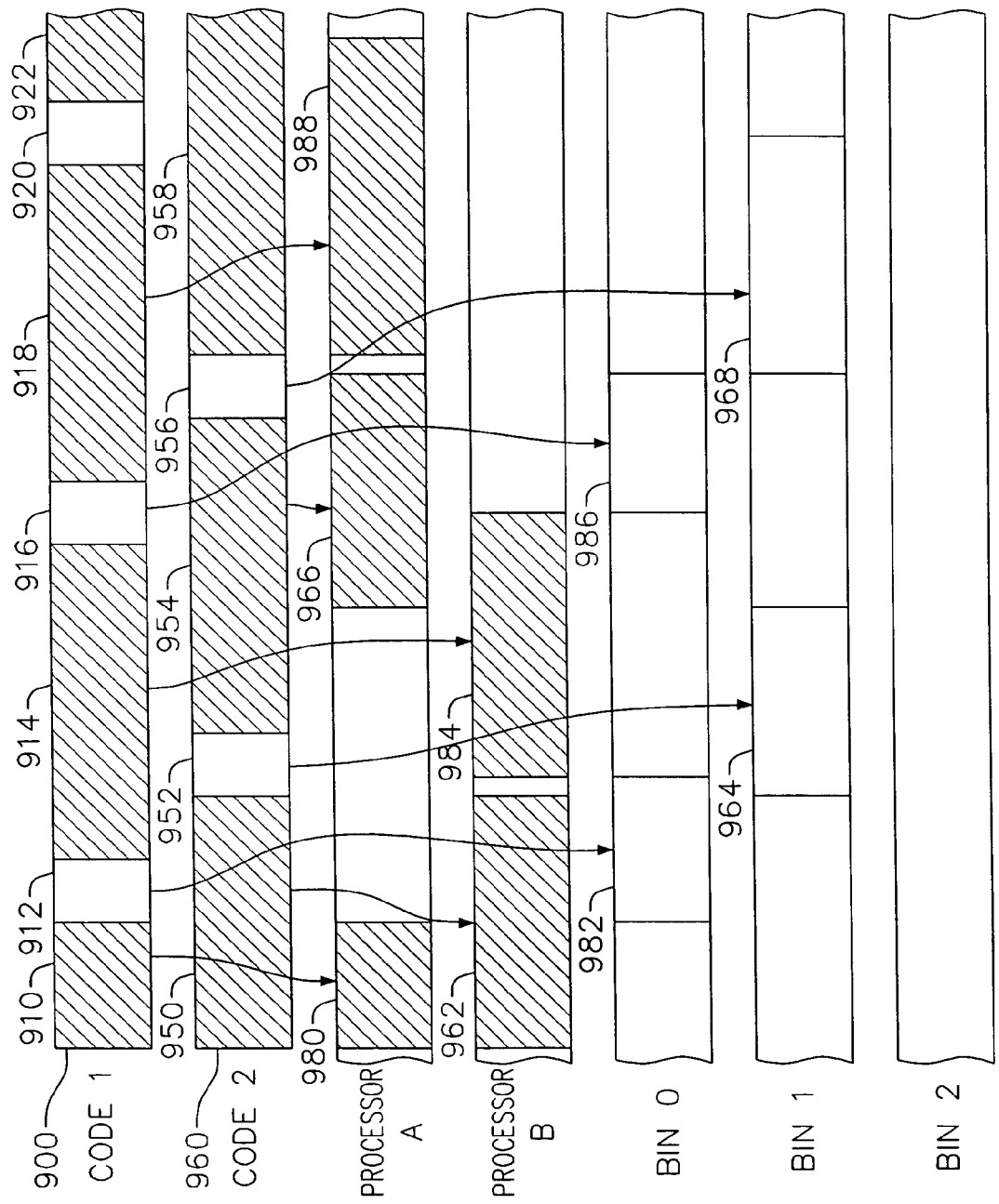
FIG. 9C is a process chart showing the allocation of the kernel segments of two processes into multiple bins.

FIG. 9C is a process chart showing the allocation of the kernel segments of two processes into multiple bins. In the FIG. 9C embodiment, source code 1 900 and source code 2 960 may be the two exemplary single threaded processes of FIG. 9A. Prior to the execution of source code 1 900 and source code 2 960 in FIG. 9C, the kernel code and overhead code sections may be identified and processed in the FIG. 6 process or in an equivalent alternate embodiment process. Utilizing the table 730 for source code 1 900, produced in step 664 of the FIG. 6 process, RTK 704 may load and execute the overhead code 910, 914, 918, and 922, and the kernel code 912, 916, and 920 into an available processor or bin as needed. Similarly, an equivalent table (not shown) may be prepared for source code 2 960. In the FIG. 9C embodiment, by utilizing this equivalent table for source code 2 960, RTK 704 may load and execute the overhead code 950, 954, and 958, and the kernel code 952 and 956, into an available processor or bin as needed.

In the exemplary FIG. 9C embodiment, RTK 704 loads the first overhead code 910, 960 sections into processor A 702 and processor B 720, respectively, for execution in time periods 980 and 962, respectively.

When overhead code 910 finishes executing, RTK 704 may load kernel code 912 into bin 0 706 for execution in time period 982. When kernel code 912 finishes executing, RTK 704 may load the next overhead code 914 into an available processor such as processor B 720 during time period 948.

When overhead code 950 finishes executing, RTK 704 may load kernel code 952 into available bin 1 708 for execution during time period 964. When kernel code 952 finishes executing RTK 704 may load the next overhead code 954 into processor A 702 for execution during time period 966.

Therefore, as shown in FIG. 9C, multiple threads may be executed utilizing the designs, bins, and tables of various embodiments of the present invention. The overhead code and kernel code sections of the several threads may be loaded and executed in an overlapping manner among the several processors and bins available.

FIG. 10 is an exemplary TAPR table, according to one embodiment. The TAPR table of FIG. 10 is a three dimensional table, containing entries that are three-tuples of the possible combinations of bins, designs, and variants. The TAPR table contains more than just a recitation of the designs of the kernel code segments mapped into the bins (hardware accelerators). Instead, the TAPR table includes the dimension of variants of the bins. Each combination of designs and bins may have multiple variants. Variants perform the identical function from the viewpoint of the inputs and outputs, but differ in implementation. An example is when bins are configured from a 3 by 4 array of MCPEs versus a 4 by 3 array of MCPEs. In this case differing timing requirements due to differing path lengths may require separate variants in the configuration and microcode data of the hardware accelerator. In one embodiment, these variants may take the form of different microcode implementations of the design, or the variants may be differing signal routing paths among the MCPEs of the bins. Two additional exemplary variants are discussed below in connection with FIG. 11 and FIG. 12.

FIG. 11 is a diagram of a first exemplary variant of a design, according to one embodiment. Memory available to a bin is a resource that may be controlled by the configuration. In this embodiment, bin 0 706 may have a memory that is logically partitioned into a lower memory 1104 and an upper memory 1102. Each memory area, for example upper memory 1102 and lower memory 1104, may be running a different context. For example, there could be a context 2 running in upper memory 1102 and an alternate context 3 loaded in lower memory 1104.

Bin 0 706 is configured in accordance with a design, but depending upon how the design is loaded in memory certain instructions such as jump and load may have absolute addresses embedded in them. Therefore the design may have a variant for loading in upper memory 1102 under the control of context 2 and a second variant for loading in lower memory 1104 under the control of context 3. Having multiple variants in this manner advantageously allows any run-time engine such as RTK 704 to load the microcode for one variant in either upper memory 1102 or lower memory 1104 while execution is still proceeding in the alternate memory space under a different context.

FIG. 12 is a diagram of a second exemplary variant of a design, according to another embodiment. The memory available to bin 1 708 may be in two physically distinct areas on the chip. In FIG. 12 one section of memory may be at physical location 1202 with data path 1212, and another section of memory may be at physical location 1204 with data path 1214. If data path 1214 is physically longer than data path 1212 then it may be necessary to insert additional clock cycles for a given design to run on bin 1 708 from memory at physical location 1202 in comparison with physical location 1204. Here the two variants differ in the number of internal wait states in the microcode of the design.

Figure 13:
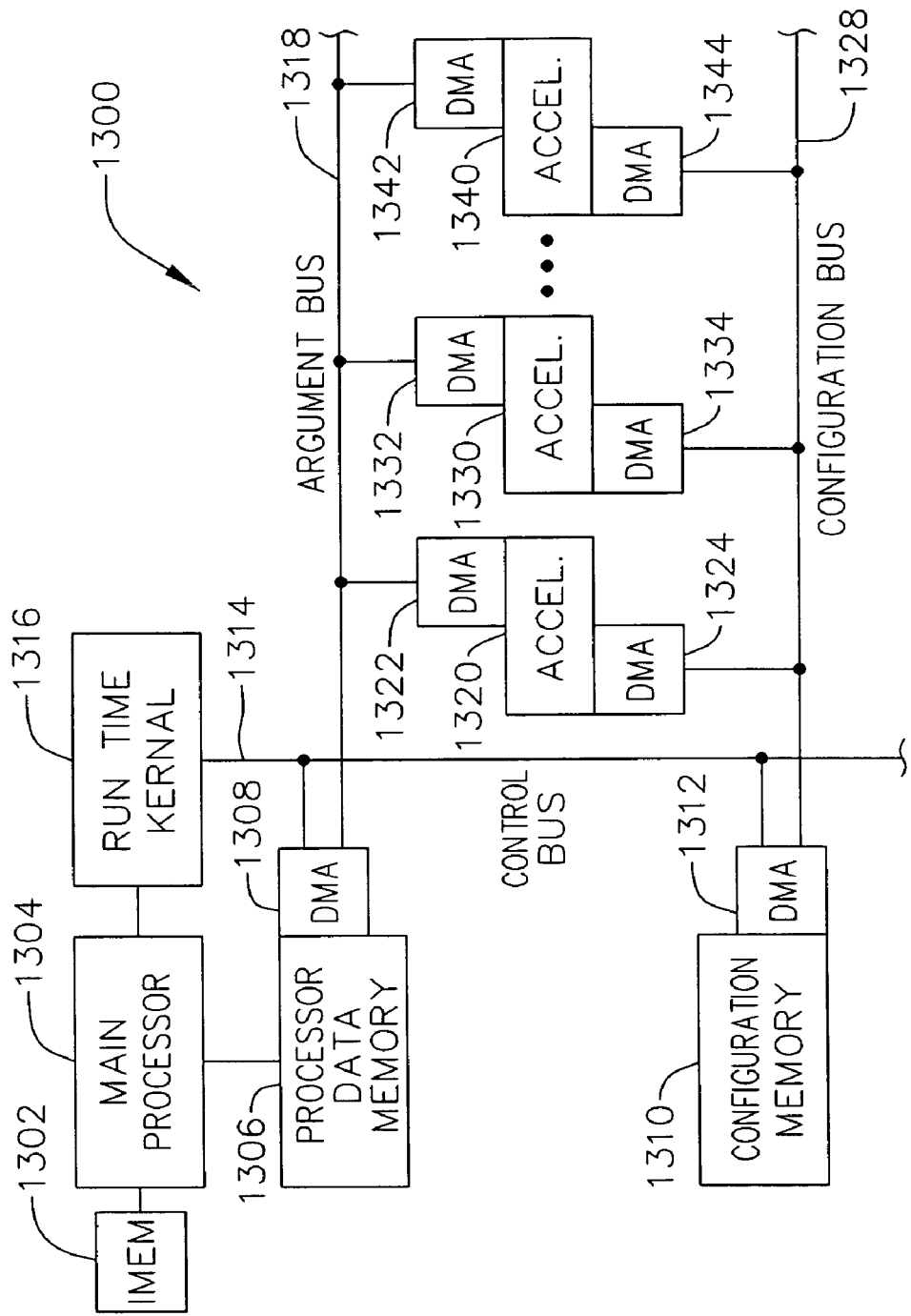
FIG. 13 is a diagram of an exemplary logical MCPE architecture, according to one embodiment.

FIG. 13 is a diagram of an exemplary logical MCPE architecture 1300, according to one embodiment. Included within architecture 1300 are main processor 1304, run time kernel (RTK) processor 1316, an instruction memory (IMEM) 1302, a processor data memory 1306 with attached DMA 1308, and a configuration memory 1310 with attached DMA 1312. RTK processor 1316 is connected to a control bus 1314, which controls the operation of DMA 1308 and DMA 1312. DMA 1308 in turn generates an argument bus 1318, and DMA 1312 in turn generates a configuration bus 1328.

Architecture 1300 also includes several hardware accelerators 1320, 1330, 1340. Each accelerator contains a local DMA for sending and receiving data to and from the argument bus 1318 and a DMA for receiving data from the configuration bus 1328. For example, accelerator 1320 has DMA 1322 for sending and receiving data to and from the argument bus 1318 and DMA 1324 for receiving data from the configuration bus 1328. In the FIG. 13 embodiment, argument bus 1318 is a bi-directional bus that may carry instruction data, argument data, and results data.

Figure 14:
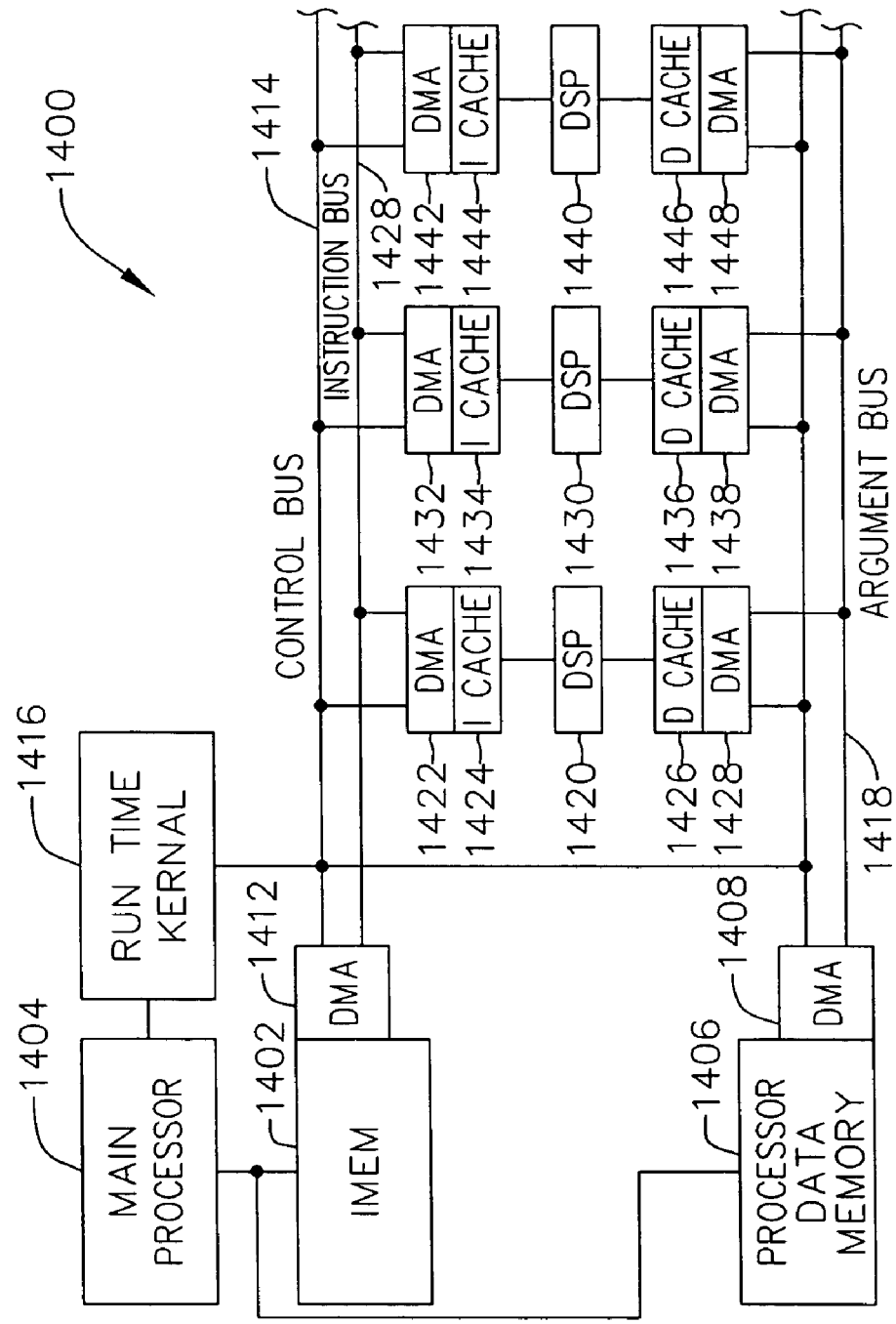
FIG. 14 is a diagram of an exemplary logical processor-based according to one embodiment.

FIG. 14 is a diagram of an exemplary logical processor-based architecture, according to one embodiment. Included within architecture 1400 are main processor 1404, run time kernel (RTK) processor 1416, an instruction memory (IMEM) 1402 with attached DMA 1412, and a processor data memory 1406 with attached DMA 1408. RTK processor 1416 generates a control bus 1414, which controls the operation of DMA 1408, 1412. DMA 1408 in turn generates an argument bus 1418, and DMA 1412 in turn generates an instruction bus 1428.

Architecture 1400 also includes several DSPs 1420, 1430, 1440. Each DSP is connected to a DMA controller for receiving argument data from the argument bus 1418 and a data cache for temporary storage of the argument data. Each DSP is also connected to a DMA controller for receiving instruction data from the instruction bus 1418 and an instruction cache for temporary storage of the instruction data. Both sets of DMA controller receive control from the control bus 1414. For example, DSP 1420 has DMA controller 1428 for receiving data from the argument bus 1418 and data cache 1426 for temporary storage of the argument data. DSP 1420 also has DMA controller 1422 for receiving data from the instruction bus 1428 and instruction cache 1424 for temporary storage of the instruction data. In the FIG. 14 embodiment, argument bus 1418 carries argument data but does not carry instruction data.

Figure 15:
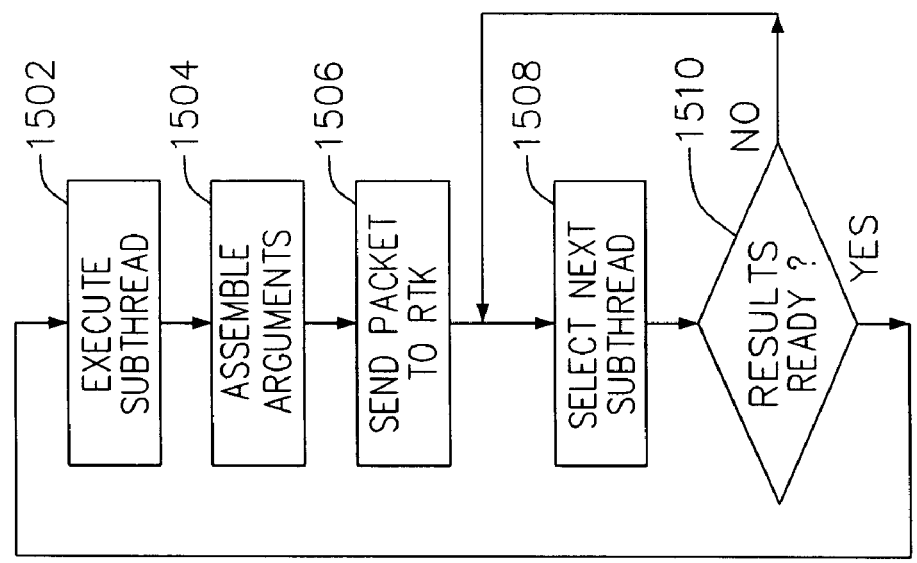
FIG. 15 is a flowchart of processor functions, according to one embodiment.

FIG. 15 is a flowchart of processor functions, according to one embodiment. The flowchart may describe operations of a main processor, such as the main processor 1304 of FIG. 13. In step 1502, the main processor executes a subthread, which may be a section of overhead code such as overhead code 910 of FIG. 9C. After the subthread has finished executing, in step 1504 the processor assembles the arguments necessary for a hardware accelerator, such as hardware accelerator 1320 of FIG. 13. Then in step 1506 the processor sends a packet containing the arguments and other related data to a run time kernel processor, such as RTK processor 1316 of FIG. 13. The RTK may send the packet containing arguments over the argument bus to a hardware accelerator. In step 1508 the main processor selects a subsequent subthread for execution. This subthread may be another section of overhead code.

However, the main processor does not immediately begin execution of this subthread. In decision step 1510, the main processor determines whether or not the results are ready from the hardware accelerator. If yes, then step 1502 is entered and the next subthread is executed. If no, however, the main processor then loads another thread and different subthread in step 1508. In this manner the main processor continuously may select and execute only those subthreads whose arguments are ready.

Figure 16:
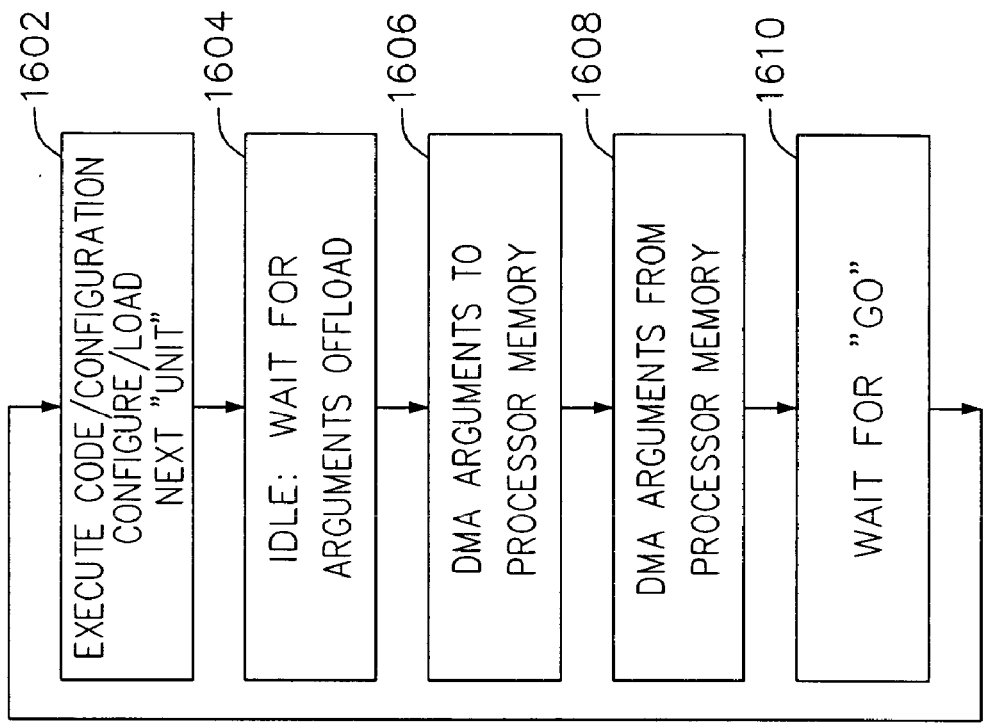
FIG. 16 is a flowchart of the hardware accelerator behavior, according to one embodiment.

FIG. 16 is a flowchart of the hardware accelerator behavior, according to one embodiment. The flowchart may describe the operations of a hardware accelerator, such as hardware accelerator 1320 of FIG. 13 or DSP 1420 of FIG. 14. In step 1602, the hardware accelerator configures itself for operation by executing code and selecting configuration control information sent via a configuration bus, such as the configuration bus 1328 of FIG. 13. Step 1602 finishes by loading a new and subsequent set of code and configuration control information should this be required during execution. Then in step 1604 the hardware accelerator waits for the arguments data to be sent from a main processor memory under control of a run time kernel processor.

In step 1606 the arguments are loaded from a main processor memory into the hardware accelerator via DMA. In one embodiment, the arguments are loaded from a processor data memory 1306 into a local DMA 1322 of hardware accelerator 1320 via an argument bus 1318 of FIG. 13. The argument bus 1318 may be under the control of a run time kernel processor, such as the RTK processor 1316. The hardware accelerator then executes its code, including 10 kernel code segments.

Then, in step 1608, the resulting arguments are sent back to the main processor via DMA. In one embodiment, the arguments are loaded back into a processor data memory 1306 from a local DMA 1322 of hardware accelerator 1320 via an argument bus 1318 of FIG. 13. Again the argument bus 1318 15 may be under the control of a run time kernel processor, such as the RTK processor 1316.

Finally, in step 1608 the hardware accelerator waits for a "go" signal to input new configuration data and code from a configuration bus, such as the configuration bus 1328 of FIG. 13. After receiving a "go" signal, the process 20 begins again at step 1602.

Figure 17:
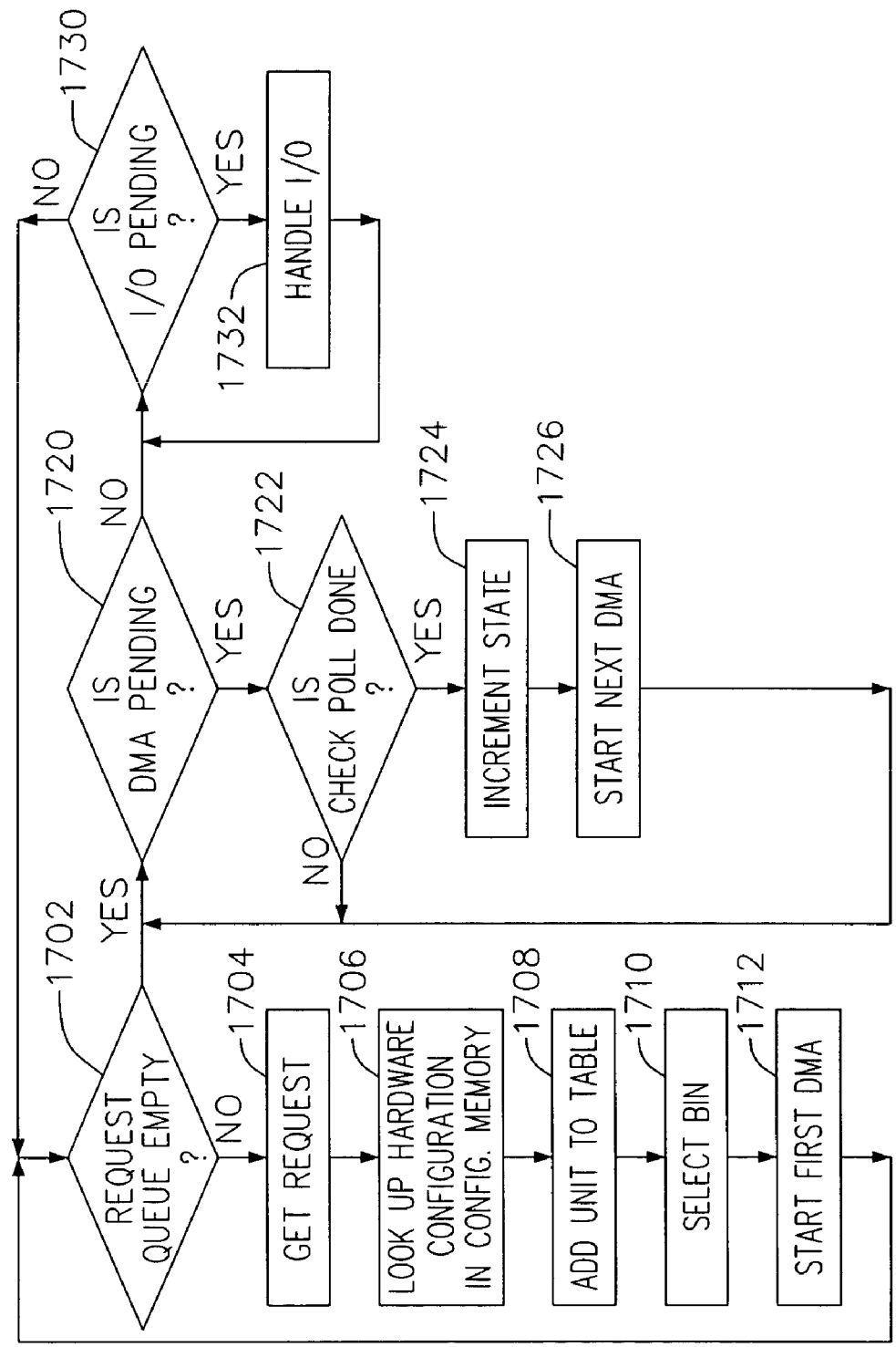
FIG. 17 is a flowchart for a RTK processor, according to one embodiment.

FIG. 17 is a flowchart for a RTK processor, according to one embodiment. The flowchart may describe the operations of a run time kernel processor, such as RTK processor 1316 of FIG. 13. In decision step 1702, the run time kernel processor examines the request queue and determines whether the request queue is empty. This request queue may contain kernel code segments of the FIG. 16 process. If the request queue is not empty, then there are kernel code segments which may be executed.

In step 1704, the run time kernel processor loads a request from the queue written by a main processor, such as main processor 1304 of FIG. 13. Then in step 1706 the run time kernel processor retrieves the configuration information needed to support execution of the requested kernel code segment. In step 1708 this information is used to build a new entry in a pending kernel code execution table. In step 1710 a hardware accelerator, which may be a bin of FIG. 7A, is selected for executing the kernel code segment. The identification of the selected hardware accelerator is added to the pending kernel code execution table. Then in step 1712 the execution is started by initiating the DMA transfer to the hardware accelerator. The process then returns to the decision step 1702.

If, however, the request queue is determined in step 1702 to be empty then the process enters decision step 1720. In step 1720 the run time kernel processor determines whether a DMA is pending. If a DMA is pending, then the process enters decision step 1722. In decision step 1722, the run time kernel processor polls the DMA devices to determine whether the DMA is done. If not, then the process loops back to decision step 1720. If, however, in step 1722 the DMA devices are done, then, in step 1724, the value of state in the pending kernel code execution table is incremented. In alternate embodiments, the polling may be replaced by an interrupt driven approach. Then in step 1726 a subsequent DMA may be started, and the process returns to decision step 1720.

If, however, in step 1720 it is determined that no DMA is pending, then the process exits through a determination of other pending input/output activity in the flexible processing environment. In decision step 1730 it is determined whether any such pending input/output activity is present. If so, then in step 1732 the input/output activity is serviced. If, however, no input/output activity is present, then the process returns to the determination of the request queue status in determination step 1702.

FIG. 18 is a table 1800 to support the operation of the RTK processor, according to one embodiment. In the FIG. 18 embodiment, the table 1800 may serve as the pending kernel code execution table used in the FIG. 17 process. The table 1800 includes entries for hardware identification 1802, state 1804, hardware accelerator (bin) 1806, DMA pending status 1808, and unit done status 1810.

An exemplary entry in table 1800 is entry 1820. Entry 1820 indicates that the hardware accelerator whose hardware identification is 3 is currently in state 4 and being invoked on hardware accelerator (bin) 3 with DMA activity still pending.

The state entry of table 1800 indicates a set of DMAs waiting to be performed in order to handle the configuration and argument loading onto the hardware accelerator and subsequent return back to data memory for processing by the main processor. In one embodiment, states numbered 1 through n may indicate that there should be a load of configuration and static memory. States numbered n through m may indicate there should be an on load of arguments from the main processors memory, these states then existing until the unit completes execution of the kernel code segment. Finally, states numbered m through p may indicate a result return back to data memory for processing by the main processor.

In the foregoing specification, the invention has been described with reference to specific embodiments thereof. It will however be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A method of executing software, comprising:
   identifying a first configuration information required to execute a first kernel code segment;
   selecting a first accelerator set configured to execute said first kernel code segment; and
   initiating a direct memory access transfer of said first configuration information to said first accelerator set.

2. The method of claim 1 further comprising building an entry in a kernel code execution table utilizing said first kernel code segment and said first configuration information.

3. The method of claim 1, wherein said first configuration information is stored in a register and wherein the register defines a context.

4. The method of claim 1, further comprising identifying a first set of arguments.

5. The method of claim 4, wherein said initiating said direct memory access transfer further comprises transferring said first set of arguments.

6. The method of claim 1, further comprising identifying a first set of microcode.

7. The method of claim 6, wherein said initiating said direct memory access transfer further comprises transferring said first set of microcode.

8. The method of claim 1, further comprising identifying a second configuration information required to execute a second kernel code segment and selecting a second accelerator set configured to execute said second kernel code segment.

9. The method of claim 8, wherein said first accelerator set and said second accelerator set are overlapping.

10. The method of claim 8, wherein said first accelerator set and said second accelerator set are non-overlapping.

11. The method of claim 10, wherein said first kernel code segment executes on said first accelerator set and said second kernel code segment executes on said second accelerator set concurrently with the first.

12. The method of claim 11, wherein a third kernel code segment executes on said first accelerator set subsequent to said first kernel code segment and concurrently with said second kernel code segment.

13. The method of claim 1, further comprising identifying a second configuration information required to execute a second kernel code segment, wherein initiating said direct memory access includes transferring the second configuration information to said first accelerator set while said first kernel code set executes on said first accelerator set.

14. The method of claim 1, wherein initiating said direct memory access includes transferring a first set of microcode to said first accelerator set while said first kernel code set executes on said first accelerator set.

15. The method of claim 1, further comprising retrieving a second kernel code segment wherein initiating said direct memory access includes transferring a first set of arguments to said first accelerator set while said first kernel code set executes on said first accelerator set.

16. The method of claim 1, further comprising determining completion requirements of said first kernel code segment to determine the order of execution of said first kernel code segment.

17. The method of claim 16, wherein said determining completion requirements of said first kernel code segment includes determining a variant of said first kernel code segment.

18. The method of claim 16, wherein said determining completion requirements of said first kernel code segment includes determining whether to execute said first kernel code segment in said first accelerator set or in a second accelerator set.

19. An apparatus, comprising:
    a memory storing a set of configuration information;
    an accelerator coupled to the memory; and
    a kernel processor coupled to the memory, said kernel processor controlling the processing of at least one thread of program code on the accelerator by initiating a direct memory access transfer of the configuration information to the accelerator.

20. The apparatus of claim 19, further comprising at least one main processor coupled to the kernel processor and memory, least one main processor being configured to process overhead code.

21. The apparatus of claim 19, wherein said the accelerator is a multiple context processing element.

22. The apparatus of claim 21, wherein said multiple context processing elements are grouped into overlapping bins.

23. The apparatus of claim 21, wherein said multiple context processing elements are grouped into non-overlapping bins.

24. The apparatus of claim 23, wherein said kernel processor is configured to load a first kernel code segment into a first one of said non-overlapping bins and to load a second kernel code segment into a second one of said non-overlapping bins.

25. The apparatus of claim 19, wherein the accelerator is a digital signal processor.

26. The apparatus of claim 25, wherein the digital signal processor has a single instruction cache.

27. The apparatus of claim 25, wherein the digital signal processor has dual instruction caches.

28. The apparatus of claim 25, wherein the digital signal processor has an instruction cache configured with dual-port memory, wherein a first port is coupled to a first bus and a second port is coupled to a second bus.

29. An apparatus configured to execute software, comprising:
- means for identifying a first configuration information required to execute a first kernel code segment;
- means for selecting a first accelerator set configured to execute said first kernel code segment; and
- means for initiating a direct memory access transfer of said first configuration information to said first accelerator set.

30. A machine-readable medium having stored thereon instructions for processing elements, which when executed by said processing elements perform the following:
- identifying a first configuration information required to execute a first kernel code segment;
- selecting a first accelerator set configured to execute said first kernel code segment; and
- initiating a direct memory access transfer of said first configuration information to said first accelerator set.

* * * * *